(12) United States Patent
Nagahama

(10) Patent No.: US 7,717,494 B2
(45) Date of Patent: May 18, 2010

(54) VEHICLE BODY UNDERSIDE AIR FLOW CONTROLLER

(75) Inventor: Satoshi Nagahama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 221 days.

(21) Appl. No.: 11/918,323

(22) PCT Filed: Apr. 13, 2006

(86) PCT No.: PCT/JP2006/308257

§ 371 (c)(1),
(2), (4) Date: Oct. 12, 2007

(87) PCT Pub. No.: WO2006/109893

PCT Pub. Date: Oct. 19, 2006

(65) Prior Publication Data

US 2009/0085371 A1  Apr. 2, 2009

(30) Foreign Application Priority Data

Apr. 13, 2005 (JP) .............................. 2005-115764

(51) Int. Cl.
*B62D 37/00* (2006.01)
(52) U.S. Cl. .................. 296/180.5; 296/180.1
(58) Field of Classification Search ............... 96/180.1, 96/180.5
See application file for complete search history.

(56) References Cited

U.S. PATENT DOCUMENTS

| 3,776,587 | A | * | 12/1973 | Oxlade | 296/180.5 |
| 4,558,897 | A | * | 12/1985 | Okuyama et al. | 296/180.5 |
| 4,951,994 | A | * | 8/1990 | Miwa | 296/180.1 |
| 6,886,883 | B2 | * | 5/2005 | Jacquemard et al. | 296/180.5 |
| 6,953,218 | B2 | * | 10/2005 | Jungert | 296/180.1 |
| 7,040,690 | B2 | * | 5/2006 | Soja et al. | 296/180.5 |
| 7,055,638 | B2 | * | 6/2006 | Khalighi et al. | 180/116 |
| 7,380,869 | B2 | * | 6/2008 | Nakaya | 296/180.1 |
| 2007/0063541 | A1 | * | 3/2007 | Browne et al. | 296/180.1 |

(Continued)

FOREIGN PATENT DOCUMENTS

JP          63-2778          1/1988

(Continued)

OTHER PUBLICATIONS

International Search Report.

(Continued)

*Primary Examiner*—Patricia L Engle
(74) *Attorney, Agent, or Firm*—Finnegan, Henderson, Farabow, Garrett & Dunner, LLP

(57) ABSTRACT

There is provided a vehicle-body underside airflow controller capable of obtaining an optimum aerodynamic performance by detecting vehicle speed and by controlling a rise angle of an under-cover (10) corresponding to the vehicle speed by driving actuators (14) so that a road clearance of the under-cover (10) becomes H2 and the rise angle thereof becomes α2 when the vehicle speed is equal to or higher than a predetermined vehicle speed (when high speed) and by driving the actuators (14) so that the road clearance of the under-cover (10) becomes H1 and the rise angle thereof becomes α1 when the vehicle speed is lower than the predetermined vehicle speed (when low speed).

6 Claims, 14 Drawing Sheets

U.S. PATENT DOCUMENTS

2007/0216194 A1* 9/2007 Rober et al. ............. 296/180.1
2009/0115221 A1* 5/2009 Shinedling et al. ....... 296/180.5

FOREIGN PATENT DOCUMENTS

| | | |
|---|---|---|
| JP | 64-8482 | 1/1989 |
| JP | 1-249582 | 10/1989 |
| JP | 2-28068 | 1/1990 |
| JP | 2-125893 | 10/1990 |
| JP | 3-128779 | 5/1991 |
| JP | 3-132482 | 6/1991 |
| JP | 8-5111 | 2/1996 |
| JP | 7-35267 | 6/1996 |
| JP | 2002-120769 | 4/2002 |

OTHER PUBLICATIONS

J. Tech. Disclosure No. 2004-504490, *Japan Institute of Invention and Innovation*, Jul. 1, 2004.

* cited by examiner

VEHICLE BODY UNDERSIDE AIR FLOW CONTROLLER

TECHNICAL FIELD

The present invention relates to a vehicle-body underside airflow controller and more specifically to a vehicle-body underside airflow controller for controlling aerodynamic characteristics of a vehicle by controlling an aerodynamic member provided at the underside of a vehicle body.

BACKGROUND ART

A technology described in Technological Disclosure No. 2004-504490 of the Japan Institute of Invention and Innovation for example has been proposed as a vehicle-body underside airflow controller.

The technology described in Technological Disclosure No. 2004-504490 of the Japan Institute of Invention and Innovation proposes to obtain optimum aerodynamic characteristics by providing a rear diffuser (or may be a floor pan or an under-cover) at the rear of the vehicle over a rear wheel at the underside of the body and by controlling a road clearance (a height from a road surface) of the rear diffuser.

Specifically, it improves straight-driving stability and steering stability of the vehicle by controlling the road clearance of the whole rear diffuser and by controlling the road clearance of the rear diffuser in the lateral direction part of the vehicle according to vehicle speed, a yaw rate and acceleration in the lateral direction of the vehicle (so-called lateral G).

However, the technology described in Technological Disclosure No. 2004-504490 of the Japan Institute of Invention and Innovation only adjusts the height of the rear diffuser from the road surface and does not change a rise angle of the rear diffuser (an angle between an extension line of the rear diffuser and the road surface) that has been set at an angle in advance.

The rise angle of the rear diffuser affects the aerodynamic performance of the vehicle and is deeply connected with contradictory requirements such as interference with the road surface and looks, so that it has been desired to be able to obtain the optimum aerodynamic characteristics.

DISCLOSURE OF THE INVENTION

In view of the facts described above, it is an object of the present invention to provide a vehicle-body underside airflow controller capable of obtaining the optimum aerodynamic performance according to various requirements by considering the contradictory requirements.

In order to achieve the aforementioned object, a vehicle-body underside airflow controller of the invention has an aerodynamic member that is attached to the underside of a vehicle body at the rear of a vehicle such that a rise angle formed between a part inclined upward on the rear side of the vehicle when seen from the side of the vehicle and a road surface when seen from the side of the vehicle is changeable and that applies force to the vehicle by an airflow flowing through the underside, changing means for changing the rise angle of the aerodynamic member by moving the vehicle-rear side of the aerodynamic member in the vertical direction of the vehicle, detecting means for detecting at least one state of the vehicle among vehicle speed, pressure generated by the airflow at the underside of the aerodynamic member and occurrence of rolling of the vehicle and control means for controlling the changing means such that the rise angle becomes smaller than the predetermined angle from the initial position of the predetermined angle when the aerodynamic performance by means of the aerodynamic member is required on the basis of a result detected by the detecting means.

According to the invention, the aerodynamic member is attached to the underside of a vehicle body at the rear of the vehicle such that a rise angle formed between a part inclined upward on the rear side of the vehicle when seen from the side of the vehicle and a road surface when seen from the side of the vehicle is changeable and applies the force (force attracting the vehicle to the road surface) to the vehicle by the airflow flowing through the underside of the body. As the aerodynamic member, for example, an under-cover that protects the underside of the body across a width of the underside of the body may be applied. Beside that, a diffuser, a baffle plate or the like may be applied.

The changing means changes the rise angle formed between a part of the aerodynamic member inclined upward on the rear side of the vehicle when seen from the side of the vehicle and a road surface (the angle in the longitudinal direction of the vehicle of the aerodynamic member with respect to the road surface) by moving the vehicle rear side of the aerodynamic member in the vertical direction of the vehicle. That is, the force acting on the vehicle may be changed and the distance between the aerodynamic member and the road surface may be changed according to the state of the vehicle by changing the angle of the aerodynamic member seen from the side of the vehicle by the changing means.

Still more, the detecting means detects the state of the vehicle and the changing means controls the changing means such that the rise angle becomes smaller than the predetermined angle from the initial position of the predetermined angle when the aerodynamic performance by means of the aerodynamic member is required on the basis of the result detected by the detecting means. That is, because the force acting on the vehicle may be changed and the distance between the aerodynamic member and the road surface may be changed according to the state of the vehicle by changing the angle of the aerodynamic member, it is possible to obtain the aerodynamic performance by the aerodynamic member by controlling the changing means so as to increase the force acting on the vehicle when the state of the vehicle requires the aerodynamic performance by the aerodynamic member, and it is possible to prevent an interference between the aerodynamic member and the road surface by controlling the changing means so as to prevent the interference between the road surface and the aerodynamic member when the state of the vehicle requires to prevent the interference between the aerodynamic member and the road surface when the vehicle speed is low. Accordingly, it becomes possible to obtain the optimum aerodynamic performance according to various requirements.

Note that it is also possible to arrange so that the detecting means detects at least one state of the vehicle among the vehicle speed, pressure generated by an airflow at the underside of the aerodynamic member and rolling of the vehicle and so that the control means may control the changing means to obtain favorable aerodynamic performance of the aerodynamic member on the basis of the state of the vehicle detected by the detecting means.

For example, the vehicle-body underside airflow controller may be arranged so that the detecting means detects the vehicle speed as the state of the vehicle and the control means controls the changing means so that the aerodynamic performance of the aerodynamic member becomes favorable on the basis of the vehicle speed detected by the detecting means. Thereby, it becomes possible to change the angle between the aerodynamic member and the horizontal plane of the vehicle, for example, at the time when the vehicle runs at high speed and at low speed by changing the angle of the aerodynamic member to the horizontal plane of the vehicle corresponding to the vehicle speed. That is, it becomes possible to control the changing means so that the force attracting the vehicle to the road surface increases in running at high speed and so that the interference between the aerodynamic member and the road surface is prevented in running at low speed.

Still more, the vehicle-body underside airflow controller may be arranged so that the detecting means detects the pressure generated by the airflow at the underside of the aerodynamic member as the state of the vehicle and so that the control means controls the changing means to obtain favorable aerodynamic performance by the aerodynamic member on the basis of the pressure detected by the detecting means. Thereby, even when the airflow is not flowing along the aerodynamic member, it becomes possible to maintain the aerodynamic performance by the aerodynamic member and to obtain the optimum aerodynamic performance by controlling the changing means so that the airflow flows along the aerodynamic member.

The vehicle-body underside airflow controller may be also configured so that the detecting means detects the vehicle speed and the pressure generated by the airflow at the underside of the aerodynamic member as the states of the vehicle and so that the control means controls the changing means to obtain the aerodynamic performance by the aerodynamic member on the basis of the vehicle speed and the pressure detected by the detecting means. Thereby, even when the airflow is not flowing along the aerodynamic member, it becomes possible to maintain the aerodynamic performance by the aerodynamic member and to obtain the optimum aerodynamic performance by controlling the changing means so that the airflow flows along the aerodynamic member in the same manner as described above.

The vehicle-body underside airflow controller may be also configured so that the detecting means detects rolling of the vehicle as the state of the vehicle and so that the control means controls the changing means to obtain favorable aerodynamic performance by the aerodynamic member becomes favorable on the basis of the rolling detected by the detecting means. Thereby, it becomes possible to control the changing means so as to suppress the rolling. That is, it becomes possible to improve running stability by controlling the changing means so that the force attracting the vehicle to the road surface becomes larger on the left side of the aerodynamic member than that on the right side in case of right rolling and so that the force attracting the vehicle to the road surface on the right side of the aerodynamic member becomes larger than that on the left side in case of left rolling.

It should be noted that when the detecting means detects the pressure generated by the airflow at the underside of the aerodynamic member as the state of the vehicle, the control means may control the changing means when the vehicle is steadily running. The steady running is running without acceleration/deceleration.

When the detecting means detects rolling of the vehicle as the state of the vehicle, the control means may control the changing means so as to change the right and left aerodynamic member independently.

The vehicle-body underside airflow controller may be arranged so as to also include vehicle height detecting means for detecting vehicle height, so that the aerodynamic member can change the road clearance, the changing means also changes the road clearance of the aerodynamic member and the control means controls the changing means so as change the road clearance of the aerodynamic member on the basis of the detected result of the vehicle height detecting means. It becomes possible to prevent the interference between the aerodynamic member and the road surface by thus controlling the changing means corresponding to the changes of the vehicle height.

The vehicle-body underside airflow controller may be also arranged to have an aerodynamic member that is attached to the underside of a vehicle body at the rear of a vehicle such that a rise angle formed between a part inclined upward on the rear side of the vehicle when seen from the side of the vehicle and that applies force to the vehicle by an airflow flowing through the underside, changing means for changing the rise angle of the aerodynamic member by moving the vehicle-rear side of the aerodynamic member in the vertical direction of the vehicle, detecting means for detecting vehicle speed and released state of the airflow flowing along the aerodynamic member and control means for controlling the changing means such that the rise angle becomes smaller than the predetermined angle from the initial position of the predetermined angle when the aerodynamic performance by means of the aerodynamic member is required on the basis of a result detected by the detecting means.

As described above, the invention brings about the effect that the optimum aerodynamic performance according to various requirements may be obtained by changing the angle of the aerodynamic member, that is attached to the underside of the body at the rear of the vehicle such that the angle with respect to the road surface seen from the side of the vehicle is changeable and that applies force to the vehicle by the airflow flowing through the underside of the body, with respect to the road surface on the basis of the state of the vehicle.

BEST MODE FOR CARRYING OUT THE INVENTION

One example of embodiments of the present invention will be explained in detail below with reference to the drawings.

First Embodiment

Figure 1A:
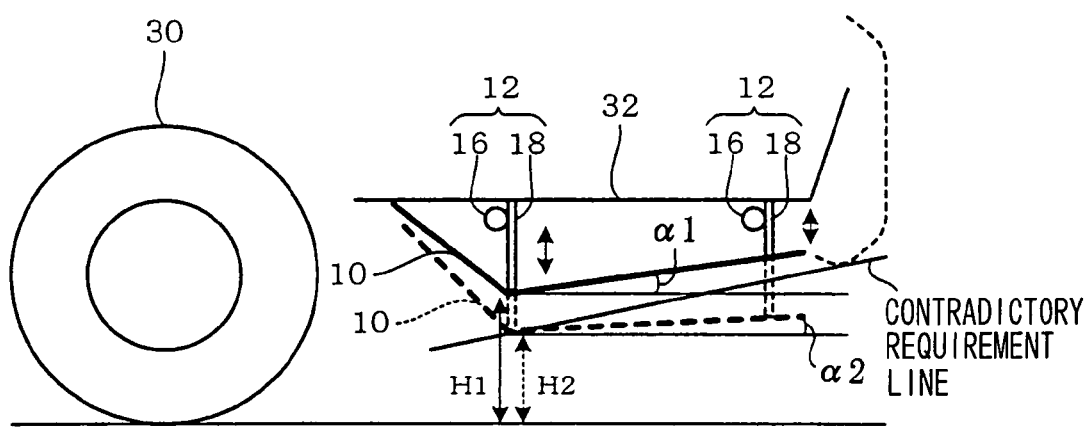
FIGS. 1A and 1B are diagrams showing a state when a vehicle-body underside airflow controller of a first embodiment of the invention is attached to a vehicle-body.
Figure 1B:
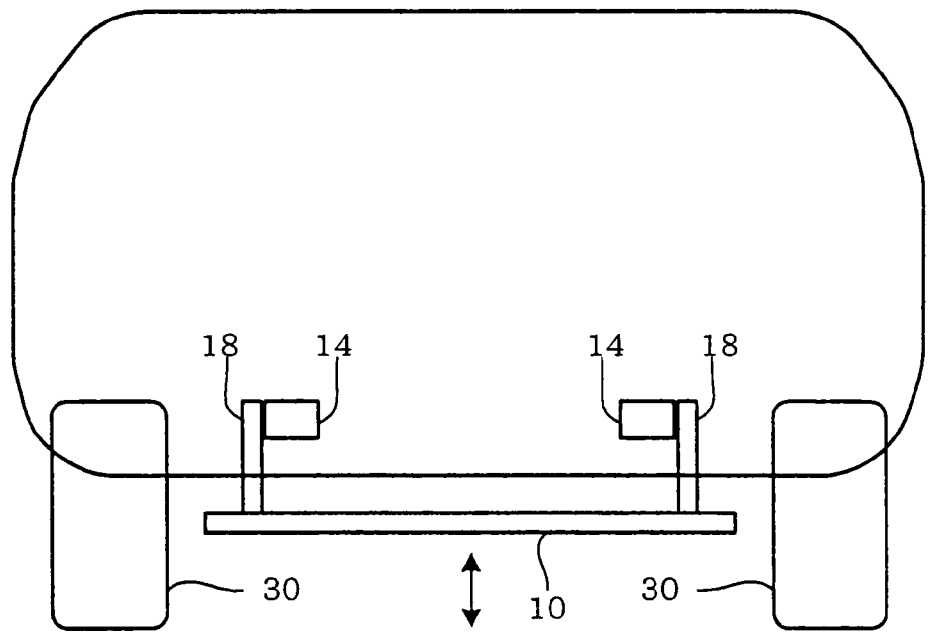

FIGS. 1A and 1B are diagrams showing a state when a vehicle-body underside airflow controller of a first embodiment of the invention is attached to a vehicle-body.

As shown in FIGS. 1A and 1B, the vehicle-body underside airflow controller of the first embodiment of the invention is composed of an under-cover 10 molded from a flexible material such as resin and changing means 12 for driving the under-cover 10.

As shown in FIG. 1A, the under-cover 10 is attached to a vehicle body, i.e., to a rear under-panel 32, at the underside of the vehicle-body at the rear of the vehicle over a rear tire 30 through an intermediary of the changing means 12 for changing a road clearance of the under-cover 10 and a rise angle of the under-cover 10 to a horizontal plane (an angle made between the under-cover 10 and the road surface when seen from the side of the vehicle) to protect the underside of the vehicle-body across a width direction of the underside of the vehicle.

The changing means 12 supports the under-cover 10 at four places. Each changing means 12 is composed of a so-called rack and pinion in the present embodiment and changes the road clearance and the rise angle with respect to the horizontal plane of the under-cover 10 by moving a rack rod 18 in a vertical direction of the vehicle by rotating a pinion gear 16 by an actuator 14 such as a motor.

Specifically, the road clearance of the whole under-cover 10 is changed by driving all of the four actuators 14 and the rise angle is changed by differentiating driving values of the two actuators 14 on the front side of the vehicle from that of the two actuators 14 on the rear side of the vehicle. It is noted that the configuration of the changing means 12 is not limited to that and another configuration using hydraulic actuators and the like may be applied.

Figure 2:
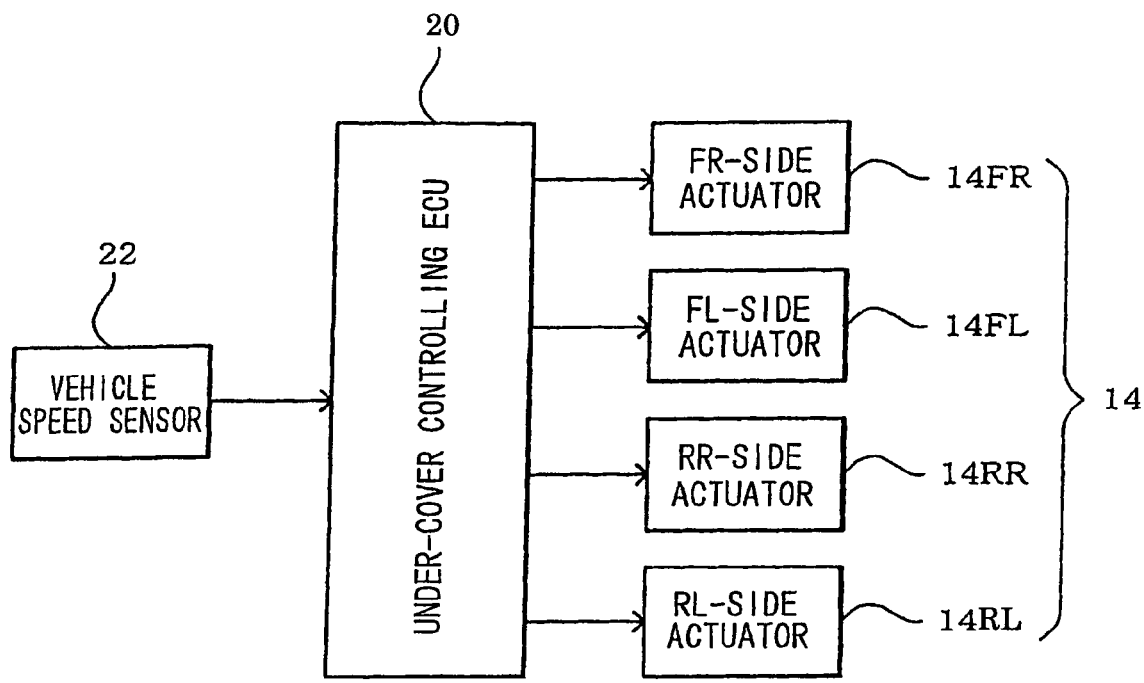
FIG. 2 is a block diagram showing a configuration of a control system of the vehicle-body underside airflow controller according to the first embodiment of the invention.

Next, a configuration of a control system of the vehicle-body underside airflow controller of the first embodiment of the invention will be explained. FIG. 2 is a block diagram showing the configuration of the control system of the vehicle-body underside airflow controller according to the first embodiment of the invention.

In the vehicle-body underside airflow controller, the actuators 14 described above are connected to an under-cover control ECU (Electronic Control Unit) 20 for controlling positions of the under-cover 10. It is noted that, in FIG. 2, the actuator on the front right side among the four actuators will be denoted as the FR-side actuator 14FR, the actuator on the front left side as the FL-side actuator 14FL, the actuator on the rear right side as the RR-side actuator 14RR and the actuator on the rear left side as the RL-side actuator 14RL. When the actuators are not specifically discriminated in the following explanation, they will be denoted as the actuator 14.

A vehicle speed sensor 22 is connected to the under-cover controlling ECU 20 to input running speed of the vehicle (vehicle speed) and the under-cover controlling ECU 20 controls the road clearance and rise angle of the under-cover 10 by driving the respective actuators 14 according to the vehicle speed.

Figure 3:
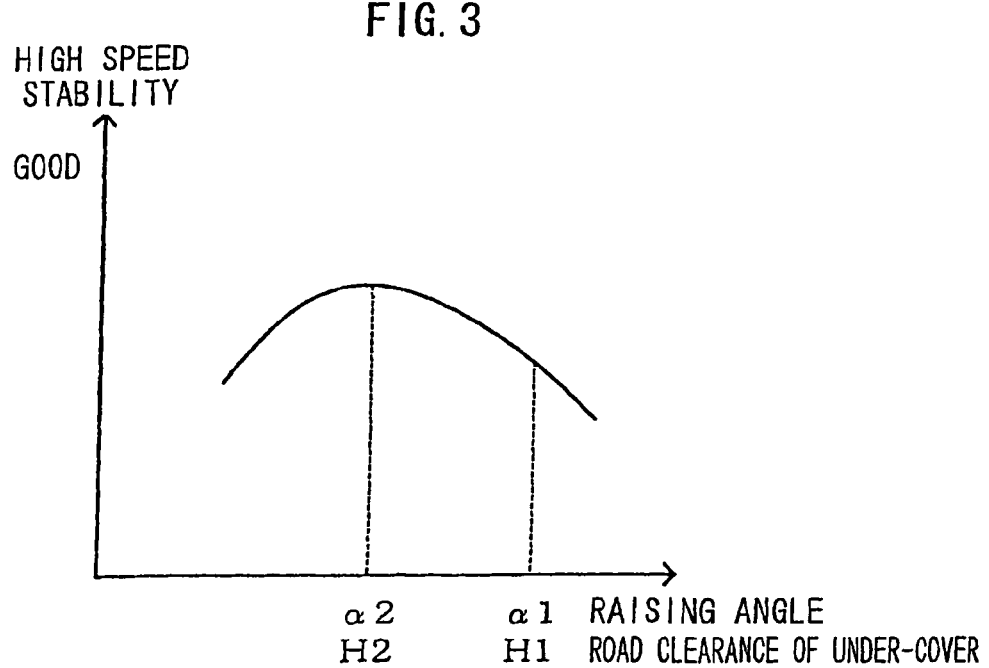
FIG. 3 is a graph showing a relationship between a rise angle of an under-cover and high-speed stability.

The under-cover controlling ECU 20 stores a driving value of each actuator 14. Specifically, the under-cover controlling ECU 20 stores driving values of the respective actuators 14 when the road clearance of the under-cover 10 is H1 and the rise angle of the under-cover 10 formed between a horizontal plane at this time is α1 and driving values of the respective actuators 14 when the road clearance of the under-cover 10 is H2 and the rise angle of the under-cover 10 formed between the horizontal plane at this time is α2. It is noted that a relationship between the rise angle and high-speed stability is as shown in FIG. 3 and values that bring about good high-speed stability are selected for the rise angle α2 and the road clearance of the under-cover H2.

The under-cover controlling ECU 20 also stores a vehicle speed threshold value set in advance for controlling each actuator 14 according to the vehicle speed, uses the vehicle speed threshold value to judge whether or not the vehicle speed is high speed and controls the drive of each actuator 14 based on the judged result.

Figure 4:
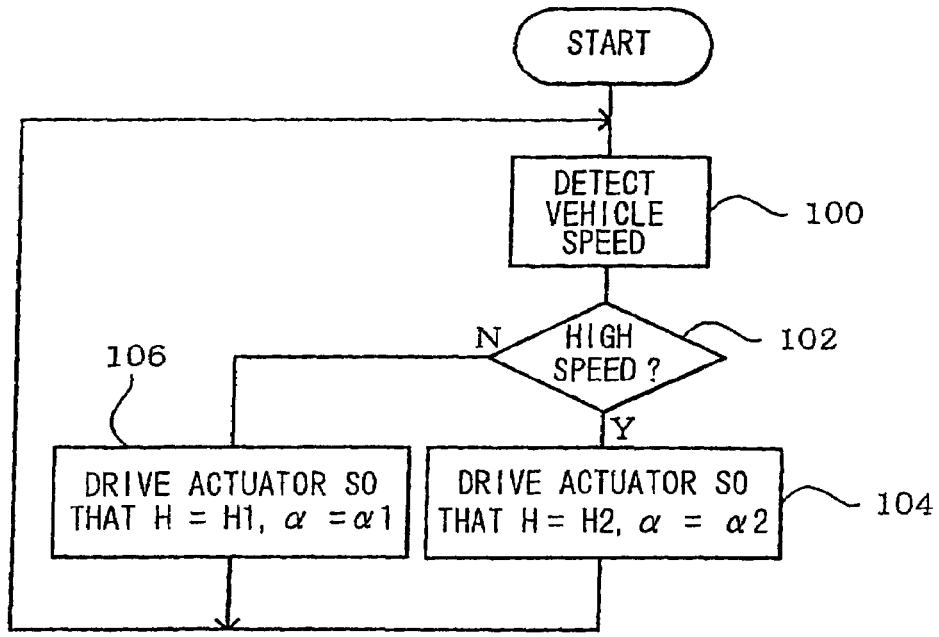
FIG. 4 is a flowchart showing one example of processes carried out by an under-cover control ECU of the vehicle-body underside airflow controller according to the first embodiment of the invention.

Next, one example of control made by the under-cover control ECU 20 of the vehicle-body underside airflow controller of the first embodiment of the invention will be explained. FIG. 4 is a flowchart showing one example of processes carried out by the under-cover control ECU 20 of the vehicle-body underside airflow controller according to the first embodiment of the invention.

At first, in Step 100, the vehicle speed is detected. That is, the vehicle speed inputted from the vehicle speed sensor 22 is detected and then the process proceeds to Step 102.

In Step 102, whether or not the vehicle speed is high speed is judged. This judgment is carried out by judging whether or not the detected vehicle speed exceeds the vehicle speed threshold value stored in the under-cover controlling ECU 20. When it is judged to be Yes, the process proceeds to Step 104 and when it is No, the process shifts to Step 106.

In Step 104, the respective actuators 14 are controlled so that the road clearance of the under-cover 10 becomes H2 and the rise angle of the under-cover 10 becomes α2. Then, the process returns to Step 100 to repeat the processes described above. That is, in Step 104, the control is carried out so that the under-cover 10 moves to the position indicated by a dotted line in FIG. 1A. Thereby, the under-cover 10 moves to a state where the high-speed stability is improved, so that force that suctions the vehicle-body to the road surface acts by airflow under the under-cover 10, assuring the high-speed stability.

On the other hand, in Step 106, the respective actuators 14 are controlled so that the road clearance of the under-cover 10 becomes H1 and the rise angle of the under-cover 10 becomes α1. Then, the process returns to Step 100 to repeat the processes described above. That is, in Step 106, the control is carried out so that the under-cover 10 moves to the position indicated by a solid line in FIG. 1A. Thereby, because the vehicle does not require an aerodynamic effect caused by the under-cover 10 so much in running at low speed, it is possible to prevent interference between the road surface and the under-cover 10 by increasing the rise angle of the under-cover 10.

By the way, the rise angle and road clearance of the under-cover 10 have contradictory requirements such as the interference with the road surface, looks and others. For example, it is preferable to dispose the under-cover 10 above a contradictory requirement line shown in FIG. 1A. According to the present embodiment, the control is carried out so that the under-cover 10 is disposed above the contradictory requirement line in running at low speed and so that the under-cover 10 moves to the position where the high-speed stability is high (raised angle: α2, road clearance: H2) in running at high speed by making the under-cover control as described above. Accordingly, the high-speed stability is assured in running at high speed by attaching more importance to the stability than the contradictory requirement and meets the contradictory requirement in running at low speed, therefore, it can be possible to meet the contradictory requirement and the stability of the vehicle as occasion demands.

It is noted that although the rise angle and road clearance of the under-cover 10 have been changed by the four changing means 12 in the first embodiment described above, the configuration of the changing means 12 is not limited to that. That is, the changing means 12 may be arranged so as to fix the front two changing means, i.e., to only support the vehicle-body and the under-cover 10, and to control only the rise angle by the rear two changing means, so as to fix the front two changing means and to control only the rise angle by one changing means on the rear side, so as to fix the rear two changing means and to control only the rise angle by the front two changing means and so as to fix the rear two changing means and to control only the rise angle by the front two changing means.

Second Embodiment

Next, the vehicle-body underside airflow controller of a second embodiment of the invention will be explained. It is noted that the state in which the vehicle-body underside airflow controller of the second embodiment is attached to the vehicle-body is the same with that of the first embodiment, so that its explanation will be omitted here.

The vehicle-body underside airflow controller of the second embodiment is what the vehicle-body underside airflow controller of the first embodiment is modified so as to change the road clearance of the under-cover 10 in correspondence to changes of vehicle height.

Figure 5:
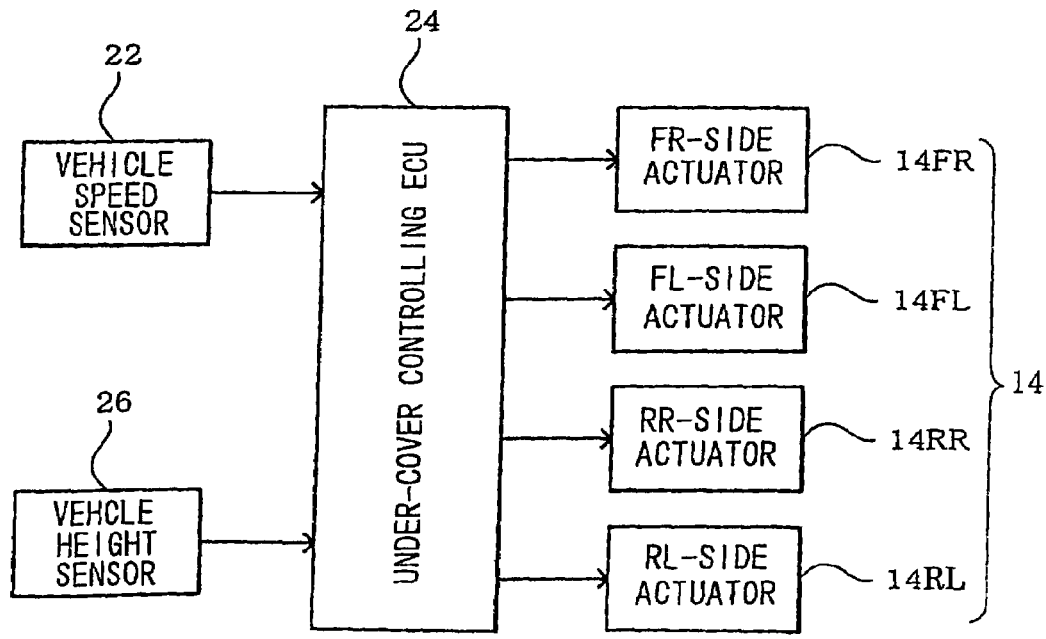
FIG. 5 is a block diagram showing a configuration of a control system of the vehicle-body underside airflow controller of a second embodiment of the invention.

FIG. 5 is a block diagram showing a configuration of a control system of the vehicle-body underside airflow controller according to a second embodiment of the invention. It is noted that the same components with those in the first embodiment will be explained by denoting the same reference numerals.

In the vehicle-body underside airflow controller of the second embodiment of the invention, the actuators 14 are connected to an under-cover control ECU 24 for controlling positions of the under-cover 10. It is noted that, in FIG. 5, the actuator on the front right side among the four actuators will be denoted as the FR-side actuator 14FR, the actuator on the front left side as the FL-side actuator 14FL, the actuator on the rear right side as the RR-side actuator 14RR and the actuator on the rear left side as the RL-side actuator 14RL. When the actuators are not specifically discriminated in the following explanation, they will be denoted as the actuator 14. To the under-cover controlling ECU 24, is connected the vehicle speed sensor 22, to which the running speed (vehicle speed) of the vehicle is input and the road clearance and rise angle of the under-cover 10 are controlled by driving the respective actuators 14 in correspondence to the vehicle speed.

The under-cover controlling ECU 24 stores a driving value of each actuator 14. Specifically, the under-cover controlling ECU 24 stores driving values of the respective actuators 14 when the road clearance of the under-cover 10 is H1 and the rise angle of the under-cover 10 formed between the horizontal plane at this time is α1 and driving values of the respective actuators 14 when the road clearance of the under-cover 10 is H2 and the rise angle of the under-cover 10 formed between the horizontal plane at this time is α2. It is noted that FIG. 3 shows the relationship between the rise angle and the high-speed stability and values that bring about good high-speed stability are selected for the rise angle α2 and the road clearance of the under-cover H2.

The under-cover controlling ECU 24 also stores the vehicle speed threshold value set in advance for controlling each actuator 14 corresponding to the vehicle speed, uses the vehicle speed threshold value to judge whether or not the vehicle speed is high speed and controls the drive of each actuator 14 based on the judged result.

In addition, in the vehicle-body underside airflow controller of the second embodiment, a vehicle height detecting sensor 26 for detecting vehicle height is connected to the under-cover controlling ECU 24 to input a result detected by the vehicle height detecting sensor 26 to the under-cover controlling ECU 24. The under-cover controlling ECU 24 controls each actuator 14 corresponding to changes of height obtained from the result detected by the vehicle height detecting sensor 26 to change the road clearance of the under-cover 10.

Figure 6:
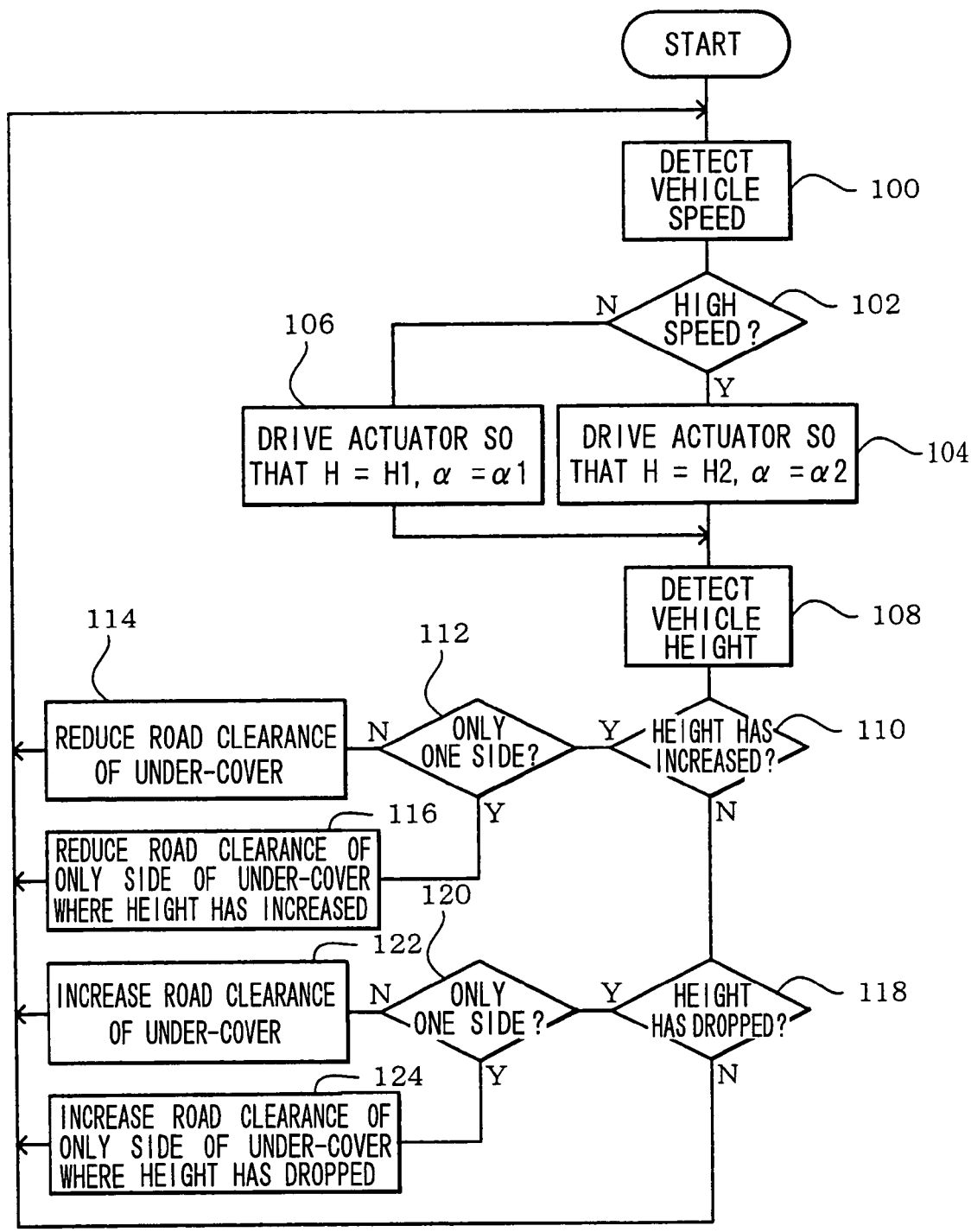
FIG. 6 is a flowchart showing one example of processes carried out by an under-cover control ECU of the vehicle-body underside airflow controller of the second embodiment of the invention.

Next, one example of control made by the under-cover controlling ECU 24 of the vehicle-body underside airflow controller of the second embodiment of the invention will be explained. FIG. 6 is a flowchart showing one example of processes carried out by the under-cover control ECU 24 of the vehicle-body underside airflow controller according to the second embodiment of the invention. It is noted the same processes with those in the first embodiment will be explained by denoting the same reference numerals.

At first, the under-cover controlling ECU 24 detects the vehicle speed in Step 100. That is, it detects the vehicle speed inputted from the vehicle speed sensor 22 and then shifts the process to Step 102.

The under-cover controlling ECU 24 judges whether or not the vehicle speed is high speed in Step 102. It carries out this judgment by judging whether or not the detected vehicle speed exceeds the vehicle speed threshold value stored in the under-cover controlling ECU 20. When it is judged to be Yes, the process shifts to Step 104 and when it is No, the process shifts to Step 106.

In Step 104, the under-cover controlling ECU 24 controls the respective actuators 14 so that the road clearance of the under-cover 10 becomes H2 and the rise angle of the under-cover 10 becomes α2. Then, the process returns to Step 100 to repeat the processes described above. That is, the under-cover controlling ECU 24 controls so that the under-cover 10 moves to the position indicated by a dotted line in FIG. 1A in Step 104. Thereby, the under-cover 10 moves to a state where the high-speed stability is improved, so that force that suctions the body to the road surface acts by airflow under the under-cover 10, assuring the high-speed stability.

In Step 106, however, the under-cover controlling ECU 24 controls the respective actuators 14 so that the road clearance of the under-cover 10 becomes H1 and the rise angle of the under-cover 10 becomes α1. Then, the process returns to Step 100 to repeat the processes described above. That is, the under-cover controlling ECU 24 controls so that the under-cover 10 moves to the position indicated by the solid line in FIG. 1A in Step 106. Thereby, because the vehicle does not require an aerodynamic effect caused by the under-cover 10 so much in running at low speed, it is possible to prevent interference between the road surface and the under-cover 10 by increasing the rise angle of the under-cover 10.

By the way, the rise angle and road clearance of the under-cover 10 have contradictory requirements such as the interference with the road surface, looks and others.

For example, it is preferable to dispose the under-cover 10 above a contradictory requirement line shown in FIG. 1A. According to the present embodiment, the under-cover controlling ECU 24 controls so that the under-cover 10 is disposed above the contradictory requirement line in running at low speed and controls so that the under-cover 10 moves to the position where the high-speed stability is high (raised angle: α2, road clearance: H2) in running at high speed by making the under-cover control as described above. Accordingly, the under-cover controlling ECU 24 assures the high-speed stability in running at high speed by attaching more importance to the stability than the contradictory requirement and meets the contradictory requirement in running at low speed. Therefore, the under-cover controlling ECU 24 can meet the contradictory requirement and the stability of the vehicle as occasion demands.

Next, the under-cover controlling ECU 24 detects the vehicle height in Step 108. That is, the under-cover controlling ECU 24 detects the vehicle height inputted from the vehicle height detecting sensor 26 and shifts the process to Step 110.

In Step 110, whether or not the vehicle height has raised is judged. This judgment is made by judging whether or not the detected height is higher than the previous height. When the judgment is No, the process shifts to Step 118 as it is and is Yes, the process shifts to Step 112.

In Step 112, whether or not the height of one side has risen is judged. When the judgment is No, the process shifts to Step 114 to drive each actuator 14 so that the under-cover 10 drops (so that the road clearance of the under-cover 10 is lowered). Then, the process returns to Step 100. When the judgment in Step 112 is Yes, the process shifts to Step 116 to drive each actuator 14 so that only the side of the under-cover 10 where the height has increased is lowered. Then the process returns to Step 100. That is, when the vehicle height has risen, the actuators 14 is controlled so as to lower the under-cover 10, so that the road clearance of the under-cover 10 is kept almost constant, allowing the optimum aerodynamic performance to be obtained.

In Step 114, whether or not the vehicle height has dropped is judged. This judgment is made by judging whether or not the detected height has dropped from the previous height. When this judgment is No, the process returns to Step 100 to repeat the aforementioned processes and when the judgment of Step 114 is Yes, the process shifts to Step 120.

In Step 120, whether or not the high-speed stability of one side has been lowered is judged. When the judgment is No, the process shifts to Step 122 to drive each actuator 14 so that the under-cover 10 is raised (so that the road clearance of the under-cover 10 increases). Then, the process returns to Step 100. When the judgment in Step 120 is Yes, the process shifts to Step 124 to drive each actuator 14 so that only the side of the under-cover 10 where the vehicle height has dropped is raised. Then, the process returns to Step 100. That is, when the vehicle height drops, the under-cover 10 is controlled to be raised, so that the road clearance of the under-cover 10 is kept constant and the optimum aerodynamic performance is maintained. Still more, it is possible to prevent the interference between the road surface and the under-cover 10 that is otherwise caused by the drop of the vehicle height.

Thus the actuators 14 is controlled to move the under-cover 10 corresponding also to the vehicle height in the second embodiment, it is possible to obtain the optimum aerodynamic performance and to prevent the interference of the under-cover 10 to the road surface when the vehicle bumps for example.

Third Embodiment

Figure 7:
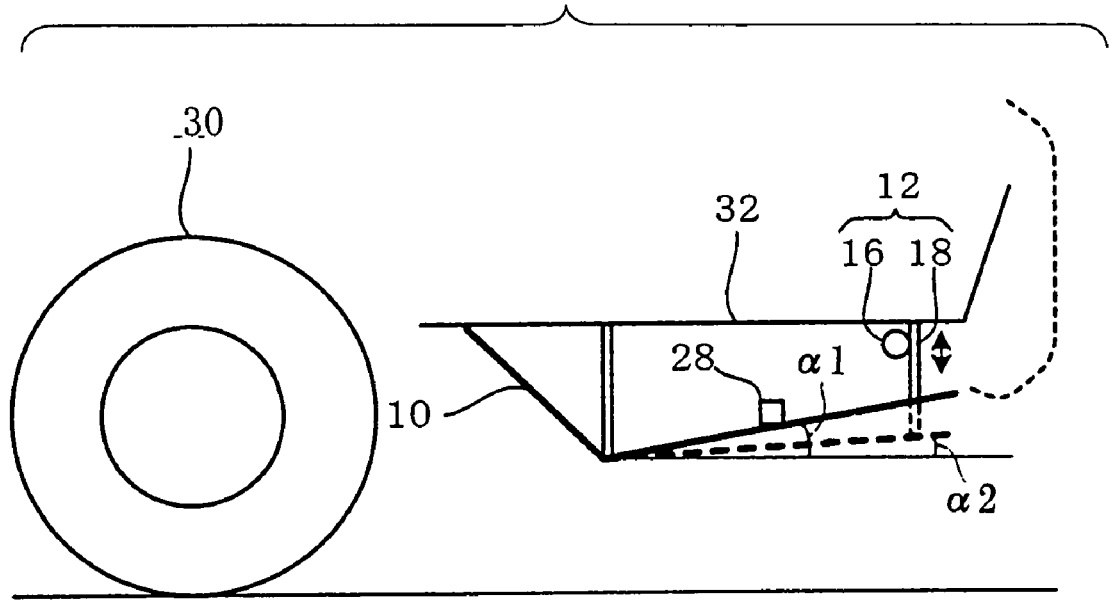
FIG. 7 is a diagram showing a state when a vehicle-body underside airflow controller of a third embodiment of the invention is attached to a vehicle-body.

Next, the vehicle-body underside airflow controller of a third embodiment of the invention will be explained. FIG. 7 is a diagram showing a state when the vehicle-body underside airflow controller of the third embodiment of the invention is attached to the body. It is noted that the same components with those of the first embodiment will be explained by denoting the same reference numerals.

As shown in FIG. 7, the vehicle-body underside airflow controller of the second embodiment of the invention is composed of the under-cover 10 molded from a flexible material such as resin and the changing means 12 for driving the under-cover 10.

Although the under-cover 10 has been attached to the under-panel 32 at the underside of the body at the rear of the vehicle over the rear tire 30 through the intermediary of four changing means 12 in the first embodiment, the two front changing means 12 among the four changing means 12 are composed of a supporting member 13 that simply supports the body and the same changing means 12 with those of the first embodiment are provided for the two rear changing means 12 in the present embodiment. That is, the rise angle of the under-cover 10 is changed by the two changing means 12 in the present embodiment. It is noted that each changing means 12 changes the rise angle of the under-cover 10 by moving the rack rod 18 in the vertical direction of the vehicle by rotating the pinion gear 16 by the actuator 14 such as a motor in the same manner with the first embodiment.

In the present embodiment, the under-cover 10 is provided also with a pressure sensor 28 for detecting pressure generated by an airflow flowing between the under-cover 10 and the road surface.

Figure 8:
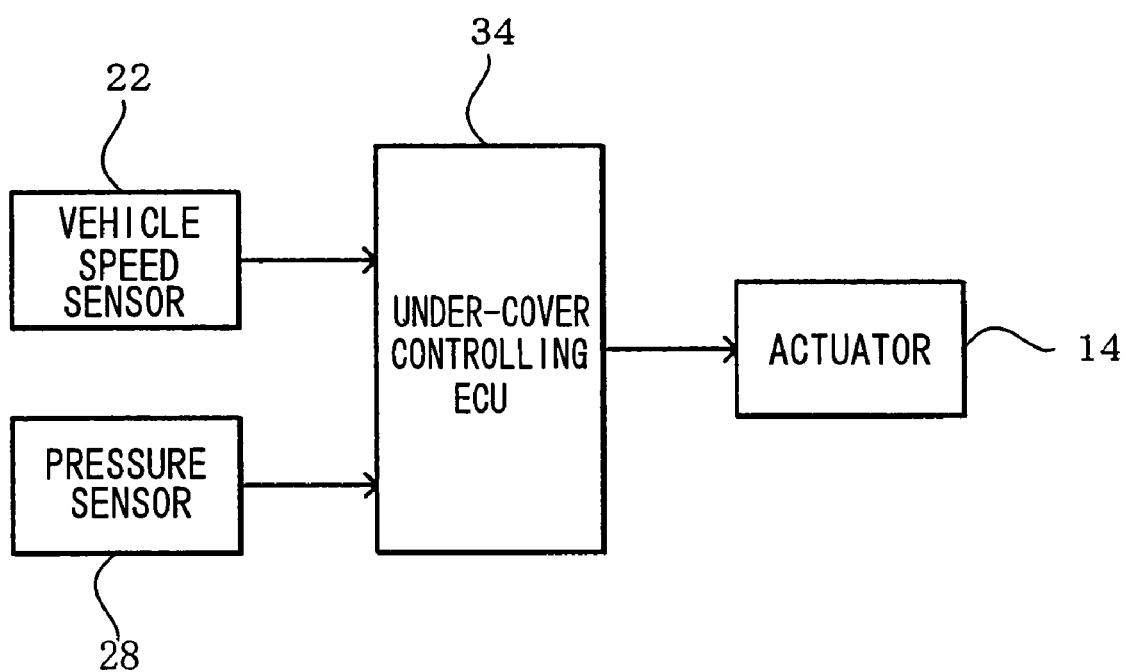
FIG. 8 is a block diagram showing a configuration of a control system of a vehicle-body underside airflow controller according to the third embodiment of the invention.

Next, a configuration of the control system of the vehicle-body underside airflow controller of the third embodiment of the invention will be explained. FIG. 8 is a block diagram showing the configuration of the control system of the vehicle-body underside airflow controller of the third embodiment of the invention. It is noted that the same components with those of the first embodiment will be explained by denoting the same reference numerals.

In the vehicle-body underside airflow controller, the actuators 14 described above are connected to an under-cover control ECU 34 for controlling positions of the under-cover 10. It is noted that in the present embodiment, the respective actuators 14 of the two changing means 12 are equally controlled, so that they will be denoted as one actuator 14 in FIG. 8.

The vehicle speed sensor 22 is connected to the under-cover controlling ECU 34 to input running speed (vehicle speed) of the vehicle. Then, the under-cover controlling ECU 34 detects an acceleration/deceleration state of the vehicle on the basis of the signal inputted from the vehicle speed sensor 22 in the present embodiment. Note that it is possible to arrange so as to detect the acceleration/deceleration of the vehicle by connecting an acceleration sensor, gyro sensor or the like instead of the vehicle speed sensor 22.

The pressure sensor 28 is also connected to the under-cover controlling ECU 34 to input a result of detection of the pressure sensor 28 and the under-cover controlling ECU 34 controls the actuator 14 corresponding to the result of detection of the pressure sensor 28.

By the way, when the vehicle runs irregular road surface, it vibrates up and down corresponding to the irregularities of the road surface. In a phase when the vehicle height increases in the vertical vibration, the airflow flowing through the underside of the under-cover 10 is released from the under-cover 10, does not flow along the under-cover 10 and lowers the aerodynamic performance of the under-cover 10. Then, the present embodiment is arranged such that the under-cover controlling ECU 34 detects the release of the airflow at the underside of the under-cover 10 by detecting the pressure and when the release of the airflow is detected, changes the rise angle of the under-cover 10 to suppress the release and to obtain the optimum aerodynamic performance.

Specifically, the under-cover controlling ECU 34 stores a threshold value for driving the actuator 14. That is, the under-cover controlling ECU 34 stores, as the threshold value, a boundary between a steady region (a state in which the airflow at the underside of the under-cover 10 is flowing along the under-cover 10) on the side of low speed and low pressure and a released region (a state in which the airflow at the underside of the under-cover 10 is released from the under-cover 10) on the side of high speed and high pressure. The under-cover controlling ECU 34 controls the rise angle of the under-cover 10 by driving the actuator 14 on the basis of this threshold value. The threshold value has a range set in advance to prevent chattering of the steady region and the released region.

It is noted that although the rise angle of the under-cover 10 is changed by the two changing means 12 in the present embodiment, the rise angle of the under-cover 10 may be changed by one changing means provided at the center or the like of the vehicle body.

Figure 10:
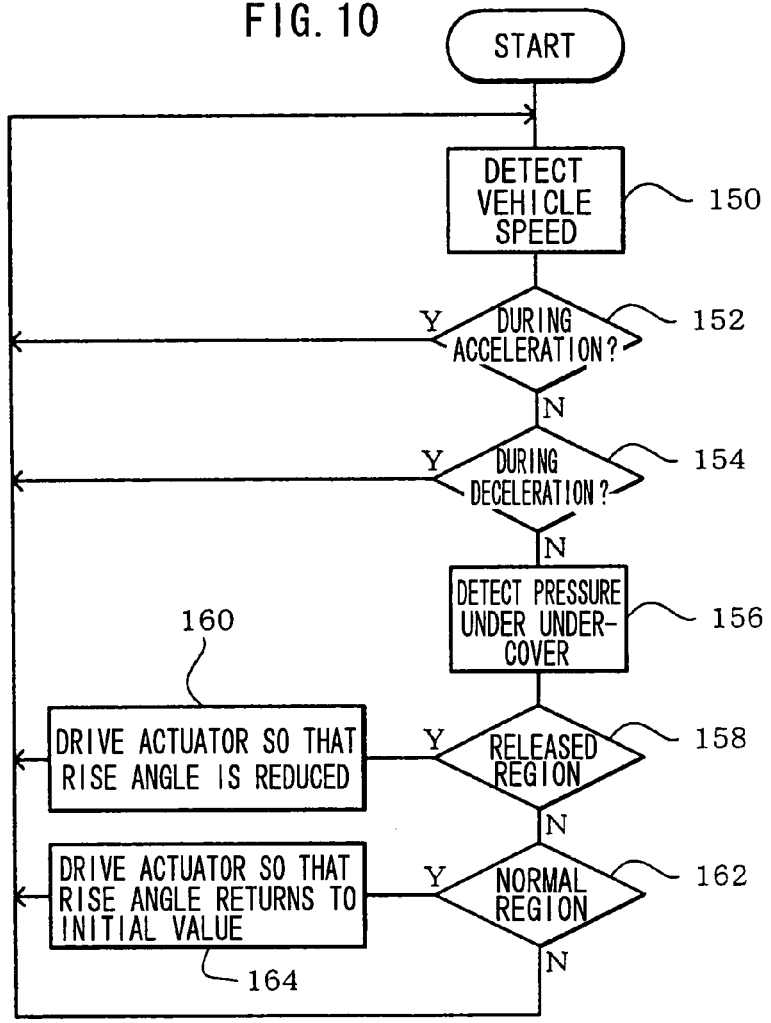
FIG. 10 is a flowchart showing one example of processes carried out by an under-cover control ECU of the vehicle-body underside airflow controller according to the third embodiment of the invention.

Next, one example of control carried out by the under-cover controlling ECU 34 of the vehicle-body underside airflow controller of the third embodiment of the invention will be explained. FIG. 10 is a flowchart showing one example of processes carried out by the under-cover control ECU 34 of the vehicle-body underside airflow controller of the third embodiment of the invention.

At first, the vehicle speed is detected in Step 150. That is, the under-cover controlling ECU 34 detects the vehicle speed inputted from the vehicle speed sensor 22 and then shifts the process to Step 152.

In Step 152, whether or not the vehicle is being accelerated is judged. This judgment is made by monitoring the vehicle speed inputted from the vehicle speed sensor 22 and by judging whether or not the speed is accelerated. When the judgment is No, the process returns to Step 150 to repeat the aforementioned processes and is Yes, the process shifts to Step 154.

In Step 154, whether or not the vehicle is being decelerated is judged. This judgment is made by monitoring the vehicle speed inputted from the vehicle speed sensor 22 and by judging whether or not the speed is decelerated. When the judgment is No, the process returns to Step 150 to repeat the aforementioned processes and is Yes, the process shifts to Step 156.

In Step 156, the pressure under the under-cover 10 is detected. That is, the pressure inputted from the pressure sensor 28 is detected.

Next, whether or not the pressure at the underside of the under-cover is located in the released region is judged in Step 158. This judgment is made by judging whether or not the pressure is located in the released region shown in FIG. 9 from the vehicle speed and the pressure inputted to the under-cover controlling ECU 34. When the judgment is Yes, the process shifts to Step 160 to drive the actuator 14 so that the rise angle of the under-cover 10 is reduced. After that, the process returns to Step 150 to repeat the aforementioned processes.

When the judgment in Step 158 is No on the other hand, the process shifts to Step 162 to judge whether or not the pressure at the underside of the under-cover is located in the steady region. This judgment is made by judging whether or not the pressure is located in the steady region shown in FIG. 9 from the vehicle speed and pressure inputted to the under-cover controlling ECU 34. When the judgment is Yes, the process shifts to Step 164 to drive the actuator 14 so that the rise angle of the under-cover 10 increases (return to the original position). After that, the process returns to Step 150 to repeat the aforementioned processes. It is noted that when the rise angle of the under-cover 10 is in the original state, the under-cover controlling ECU 34 skips the process of Step 164 and returns to Step 150.

When the judgment in Step 162 is No on the other hand, the process returns to Step 160 as it is to repeat the aforementioned processes.

Thus, according to the present embodiment, the under-cover controlling ECU 34 controls so that the airflow flows along the under-cover 10 by reducing the rise angle of the under-cover 10 when the pressure under the under-cover 10 increases by the airflow between the under-cover 10 and the road surface, causing the released state and returns the rise angle of the under-cover 10 to the original state by increasing the rise angle of the under-cover 10 when the pressure under the under-cover 10 drops and becomes the normal state. Thereby, it becomes possible to obtain the optimum aerodynamic performance.

It is noted that because the vehicle causes pitching temporarily due to acceleration/deceleration during when the vehicle is being accelerated/decelerated, the rise angle of the under-cover 10 is not changed during the acceleration/deceleration.

Figure 11:
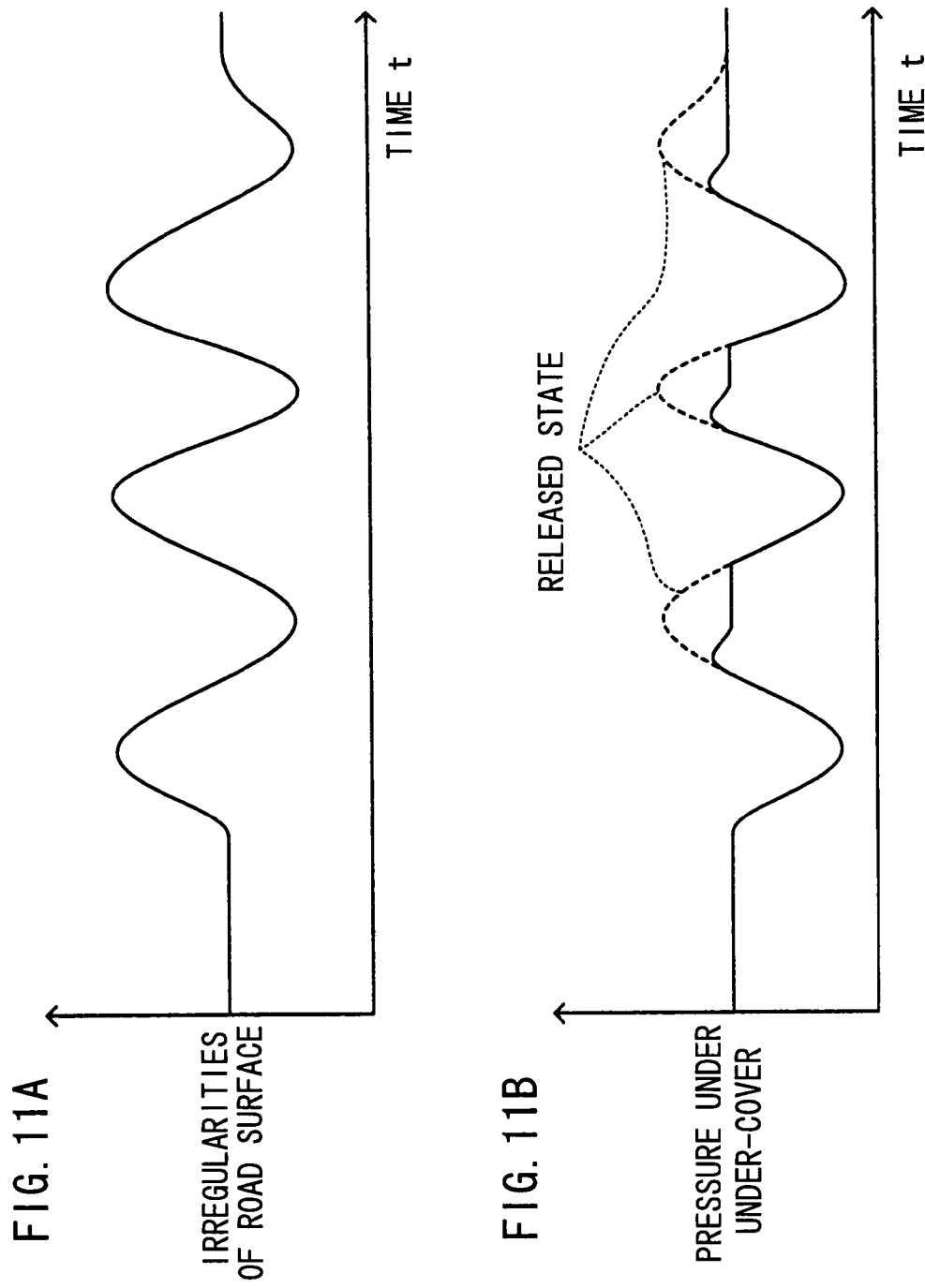
FIGS. 11A and 11B are charts for explaining one example of control of the vehicle-body underside airflow controller according to the third embodiment of the invention.

For example, when the vehicle runs the irregular road surface repeatedly having convex and concave road surfaces as shown in FIG. 11A, the pressure under the under-cover 10 drops on the convex road surface and rises on the concave road surface as shown in FIG. 11B. However, according to the present embodiment, because the control is made so as to reduce the rise angle of the under-cover 10 when the airflow flowing between the under-cover 10 and the road surface causes the release as indicated by a dotted line, the increase of the pressure under the under-cover 10 is suppressed as indicated by a dotted line in FIG. 11B. Thereby, the airflow flowing between the under-cover 10 and the road surface flows along the under-cover 10, improving the stability of the vehicle. Accordingly, it is possible to maintain the aerodynamic performance of the under-cover 10 by changing the rise angle of the under-cover 10 corresponding to changes of pressure under the under-cover 10.

It is noted that although the rise angle of the under-cover 10 has been controlled on the basis of the vehicle height and pressure in the third embodiment, it may be arranged so as to control the rise angle of the under-cover 10 on the basis of only pressure.

Fourth Embodiment

Figure 12:
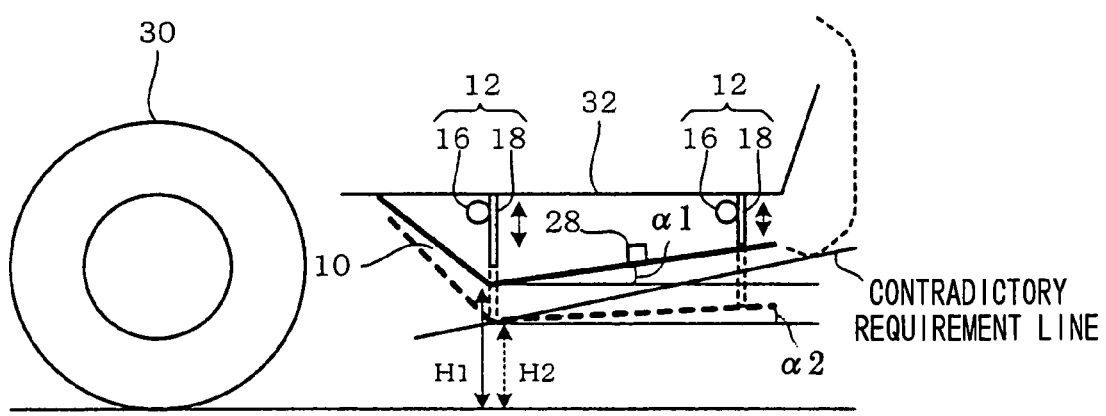
FIG. 12 is a diagram showing a state when a vehicle-body underside airflow controller of a fourth embodiment of the invention is attached to a vehicle-body.

Next, the vehicle-body underside airflow controller of a fourth embodiment of the invention will be explained. FIG. 12 is a diagram showing a state when the vehicle-body underside airflow controller of the fourth embodiment of the invention is attached to the vehicle body. It is noted that the same components with those of the first through third embodiments will be explained by denoting the same reference numerals.

The vehicle-body underside airflow controller of the fourth embodiment is a mode in which the first embodiment is combined with the third embodiment. That is, the vehicle-body underside airflow controller of the fourth embodiment is composed of the under-cover 10 molded from a flexible material such as resin and the changing means 12 for driving the under-cover 10.

Similarly to the first embodiment and as shown in FIG. 12, the under-cover 10 is attached to a vehicle body, i.e., to the under-panel 32, at the underside of the body at the rear of the vehicle over the rear tire 30 through the intermediary of the changing means 12 for changing the road clearance of the under-cover 10 and the rise angle of the under-cover 10 to the horizontal plane.

Similarly to the first embodiment, the changing means 12 supports the under-cover 10 at four places. Each changing means 12 is composed of a so-called lack and pinion in the present embodiment and changes the road clearance and the rise angle to the horizontal plane of the under-cover 10 by moving the rack rod 18 in the vertical direction of the vehicle by rotating the pinion gear 16 by the actuator 14 such as a motor.

Specifically, the road clearance of the whole under-cover 10 is changed by driving all of the four actuators 14 and the rise angle is changed by differentiating a driving value of the two actuators 14 on the front side of the vehicle from that of the two actuators 14 on the rear side of the vehicle. It is noted that the configuration of the changing means 12 is not limited to that and another configuration using hydraulic actuators and the like may be used.

The under-cover 10 is provided with the pressure sensor 28 that detects pressure generated by an airflow flowing between the under-cover 10 and the road surface in the same manner with the third embodiment.

Figure 13:
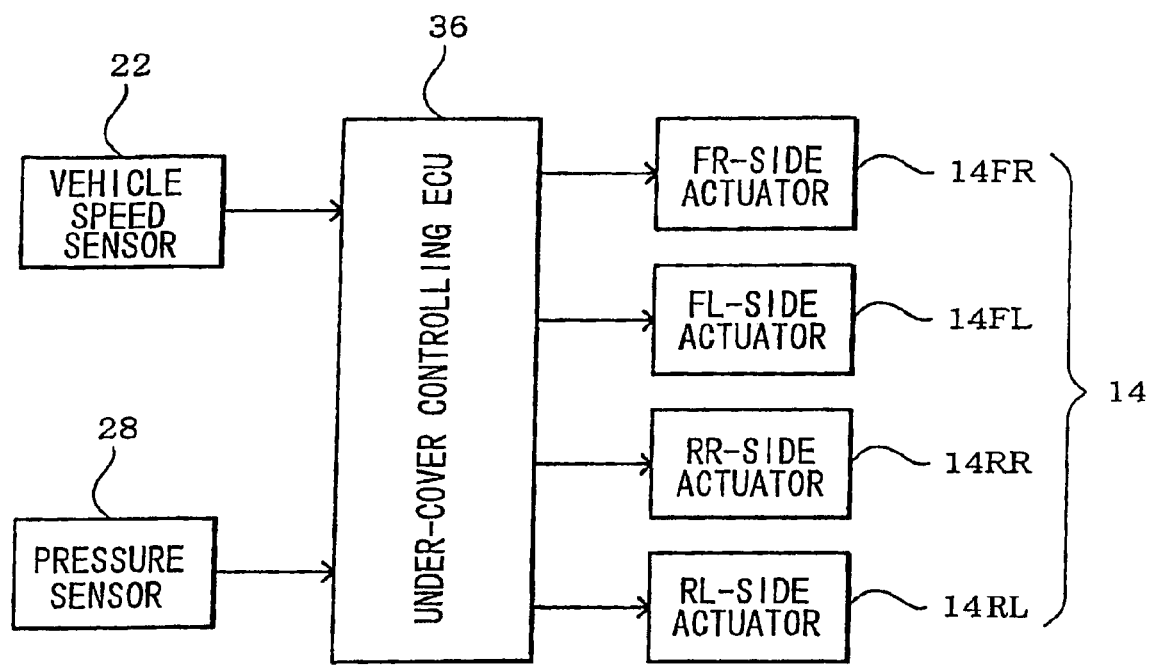
FIG. 13 is a block diagram showing a configuration of a control system of a vehicle-body underside airflow controller according to the fourth embodiment of the invention.

Next, a configuration of a control system of the vehicle-body underside airflow controller of the fourth embodiment of the invention will be explained. FIG. 13 is a block diagram showing the configuration of the control system of the vehicle-body underside airflow controller of the fourth embodiment of the invention. It is noted that the same components with those of the first and third embodiments will be explained by denoting the same reference numerals.

In the vehicle-body underside airflow controller, the actuators 14 described above are connected to an under-cover control ECU 36 for controlling positions of the under-cover 10. It is noted that in FIG. 13, the actuator on the front right side among the four actuators will be denoted as the FR-side actuator 14FR, the actuator on the front left side as the FL-side actuator 14FL, the actuator on the rear right side as the RR-side actuator 14RR and the actuator on the rear left side as the RL-side actuator 14RL. When the actuators are not specifically discriminated in the following explanation, they will be denoted as the actuator 14.

The vehicle speed sensor 22 is connected to the under-cover controlling ECU 36 to input running speed (vehicle speed) of the vehicle. Then, the under-cover controlling ECU 36 detects an acceleration/deceleration state of the vehicle on the basis of the signal inputted from the vehicle speed sensor 22 in the present embodiment. Note that it is possible to arrange so as to detect the acceleration/deceleration of the vehicle by connecting an acceleration sensor, gyro sensor or the like instead of the vehicle speed sensor 22.

The pressure sensor 28 is also connected to the under-cover controlling ECU 36 to input a result of detection of the pressure sensor 28 and the under-cover controlling ECU 36 controls the actuator 14 corresponding to the result of detection of the pressure sensor 28.

By the way, when the vehicle runs irregular road surface, it vibrates up and down corresponding to the irregularities of the road surface. In a phase when the vehicle height increases in the vertical vibration, the airflow flowing through the underside of the under-cover 10 is released from the under-cover 10, does not flow along the under-cover 10 and lowers the aerodynamic performance of the under-cover 10. Then, the present embodiment is arranged such that the under-cover controlling ECU 36 detects the release of the airflow at the underside of the under-cover 10 by detecting the pressure and when the release of the airflow is detected, changes the rise angle of the under-cover 10 to suppress the release and to obtain the optimum aerodynamic performance.

Specifically, the under-cover controlling ECU 36 stores a driving value of each actuator 14. Similarly to the first embodiment and as shown in FIG. 12, the under-cover controlling ECU 36 stores driving values of the respective actuators 14 when the road clearance of the under-cover 10 is H1 and the rise angle of the under-cover 10 formed between the horizontal plane at this time is α1 and driving values of the respective actuators 14 when the road clearance of the under-cover 10 is H2 and the rise angle of the under-cover 10 formed between the horizontal plane at this time is α2.

Figure 9:
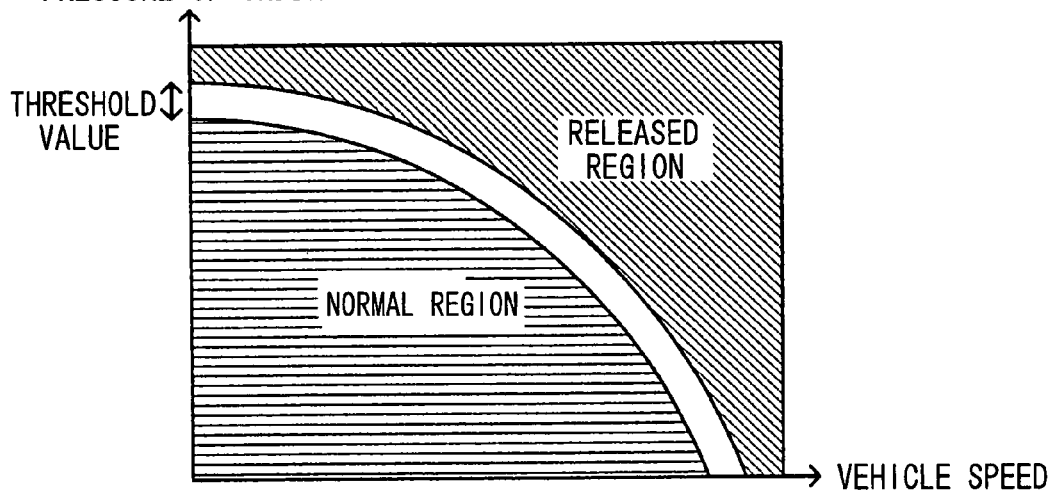
FIG. 9 is a graph showing a threshold value for driving the under-cover.

The under-cover controlling ECU 36 also stores the threshold value for driving the actuator 10. That is, the under-cover controlling ECU 36 stores, as the threshold value, a boundary between the steady region on the side of low speed and low pressure and the released region on the side of high speed and high pressure similarly to the third embodiment and as shown in FIG. 9. The under-cover controlling ECU 36 controls the road clearance and the rise angle of the under-cover 10 by driving the actuator 14 on the basis of this threshold value.

Figure 14:
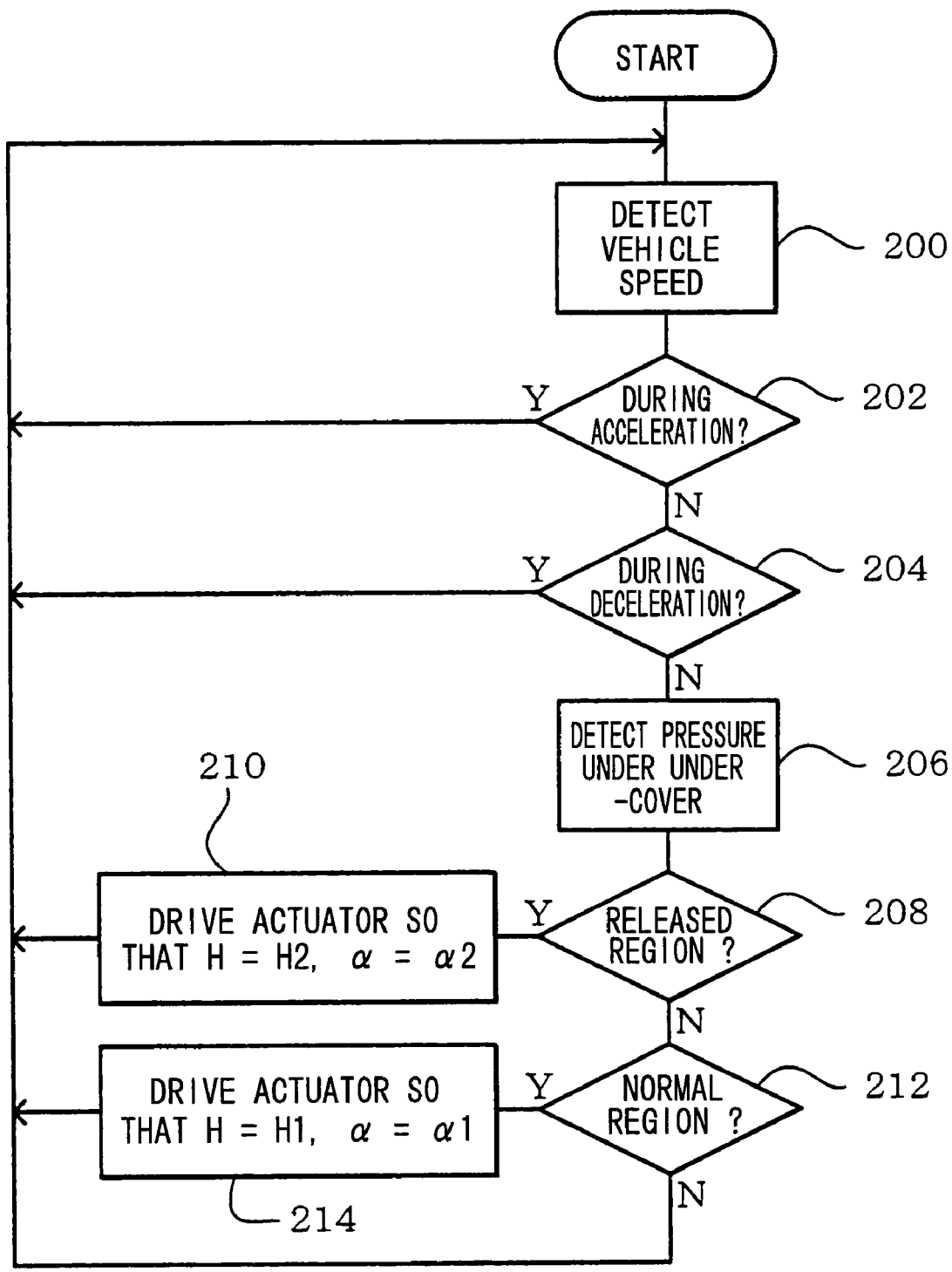
FIG. 14 is a flowchart showing one example of processes carried out by an under-cover control ECU of the vehicle-body underside airflow controller according to the fourth embodiment of the invention.

Next, one example of control made by the under-cover controlling ECU 36 of the vehicle-body underside airflow controller of the fourth embodiment of the invention will be explained. FIG. 14 is a flowchart showing one example of processes carried out by the under-cover control ECU 36 of the vehicle-body underside airflow controller of the fourth embodiment of the invention.

At first, the vehicle speed is detected in Step 200. That is, the vehicle speed inputted from the vehicle speed sensor 22 is detected and the process is proceeded to Step 202.

In Step 202, whether or not the vehicle is being accelerated is detected. This judgment is made by monitoring the vehicle speed inputted from the vehicle speed sensor 22 and by judging whether or not the speed is accelerated. When the judgment is No, the process returns to Step 200 to repeat the aforementioned processes and is Yes, the process shifts to Step 204.

In Step 204, whether or not the vehicle is being decelerated is judged. This judgment is made by monitoring the vehicle speed inputted from the vehicle speed sensor 22 and by judging whether or not the speed is decelerated. When the judgment is No, the process returns to Step 200 to repeat the aforementioned processes and is Yes, the process shifts to Step 206.

In Step 206, the pressure under the under-cover 10 is detected. That is, the pressure inputted from the pressure sensor 28 is detected.

Next, whether or not the pressure at the underside of the under-cover is located in the released region is judged in Step 208. This judgment is made by judging whether or not the pressure is located in the released region shown in FIG. 9 from the vehicle speed and the pressure inputted to the under-cover controlling ECU 36. When the judgment is Yes, the process shifts to Step 210 to drive each actuator 14 so that the road clearance of the under-cover 10 becomes H2 and the rise angle of the under-cover 10 becomes α2. After that, the process returns to Step 200 to repeat the aforementioned processes. That is, the control is made so that the under-cover 10 moves to the position indicated by a dotted line in FIG. 12 in Step 210.

When the judgment in Step 208 is No on the other hand, the process shifts to Step 212 to judge whether or not the pressure at the underside of the under-cover is located in the steady region. This judgment is made by judging whether or not the pressure is located in the steady region shown in FIG. 9 from the vehicle speed and pressure inputted to the under-cover controlling ECU 36. When the judgment is Yes, the process shifts to Step 214 to drive each actuator 14 so that the road clearance of the under-cover 10 becomes H1 and the rise angle of the under-cover 10 becomes α1. After that, the process returns to Step 200 to repeat the aforementioned processes. That is, the control is made so that the under-cover 10 moves to the position indicated by a solid line in FIG. 12 in Step 214.

When the judgment in Step 212 is No on the other hand, the process returns to Step 200 as it is to repeat the aforementioned processes.

Thus, according to the present embodiment, the under-cover controlling ECU 36 controls so that the airflow flows along the under-cover 10 by lowering the road clearance and by reducing the rise angle of the under-cover 10 when the pressure under the under-cover 10 increases by the airflow between the under-cover 10 and the road surface, causing the released state and returns the rise angle of the under-cover 10 to the original state by increasing the road clearance and by increasing the rise angle of the under-cover 10 when the pressure under the under-cover 10 drops and becomes the normal state. Thereby, it becomes possible to obtain the optimum aerodynamic performance in the same manner with each embodiment described above.

It is noted that because the vehicle causes pitching temporarily due to acceleration/deceleration during when the vehicle is being accelerated/decelerated, the road clearance and rise angle of the under-cover 10 are not changed during the acceleration/deceleration in the present embodiment.

Fifth Embodiment

Next, the vehicle-body underside airflow controller of a fifth embodiment of the invention will be explained. It is noted that the state in which the vehicle-body underside airflow controller of the fifth embodiment is attached to the body is the same with that of the first embodiment, so that its explanation will be omitted here.

The vehicle-body underside airflow controller of the fifth embodiment is what changes right and left road clearances and rise angles of the under-cover 10 separately corresponding to rolling of the vehicle.

That is, as explained in the first embodiment, the under-cover 10 is molded from the flexible material such as resin, a control is made so as to suppress the rolling by differentiating the right and left road clearances and rise angles of the under-cover 10 by differently driving the right and left actuators 14.

Figure 15:
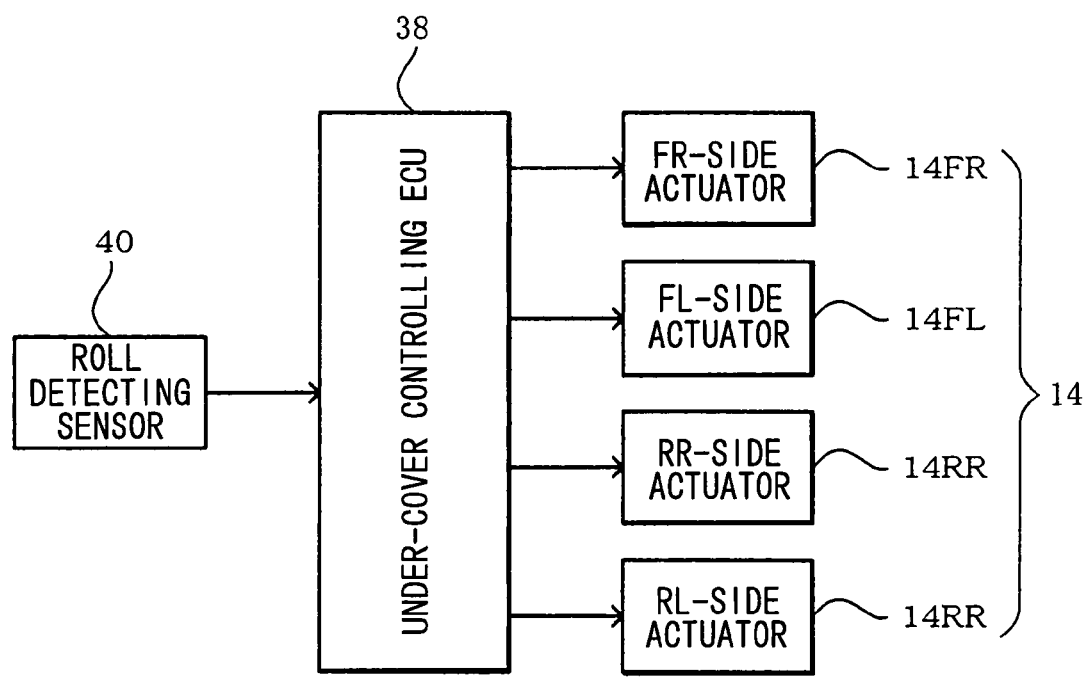
FIG. 15 is a block diagram showing a configuration of a control system of a vehicle-body underside airflow controller according to a fifth embodiment of the invention.

FIG. 15 is a block diagram showing a configuration of a control system of a vehicle-body underside airflow controller according to a fifth embodiment of the invention. It is noted that the same components with those of the first embodiment will be explained by denoting the same reference numerals.

Similarly to the first embodiment, in the vehicle-body underside airflow controller, the actuators 14 are connected to an under-cover control ECU (Electronic Control Unit) 38 for controlling positions of the under-cover 10. It is noted that in FIG. 15, the actuator on the front right side among the four actuators will be denoted as the FR-side actuator 14FR, the actuator on the front left side as the FL-side actuator 14FL, the actuator on the rear right side as the RR-side actuator 14RR and the actuator on the rear left side as the RL-side actuator 14RL. When the actuators are not specifically discriminated in the following explanation, they will be denoted as the actuator 14.

Furthermore, a rolling detecting sensor 40 is connected to the under-cover controlling ECU 38 of the fifth embodiment of the invention to detect rolling of the vehicle. The under-cover controlling ECU 38 controls the road clearance and rise angle of the under-cover 10 by driving each actuator 14 corresponding to the rolling.

The under-cover controlling ECU 38 stores a driving value of each actuator 14. Specifically, the under-cover controlling ECU 38 stores driving values of the respective actuators 14 when the road clearance of the under-cover 10 is H1 and the rise angle of the under-cover 10 formed between the horizontal plane at this time is α1 and driving values of the respective actuators 14 when the road clearance of the under-cover 10 is H2 and the rise angle of the under-cover 10 formed between the horizontal plane at this time is α2 as shown in FIG. 1A and in the same manner with the first embodiment. It is noted that in the present embodiment, the under-cover controlling ECU 38 controls the rise angle and road clearance by differently driving the right actuators 14FR and 14RR and the left actuators 14FL and 14RL.

Figure 16:
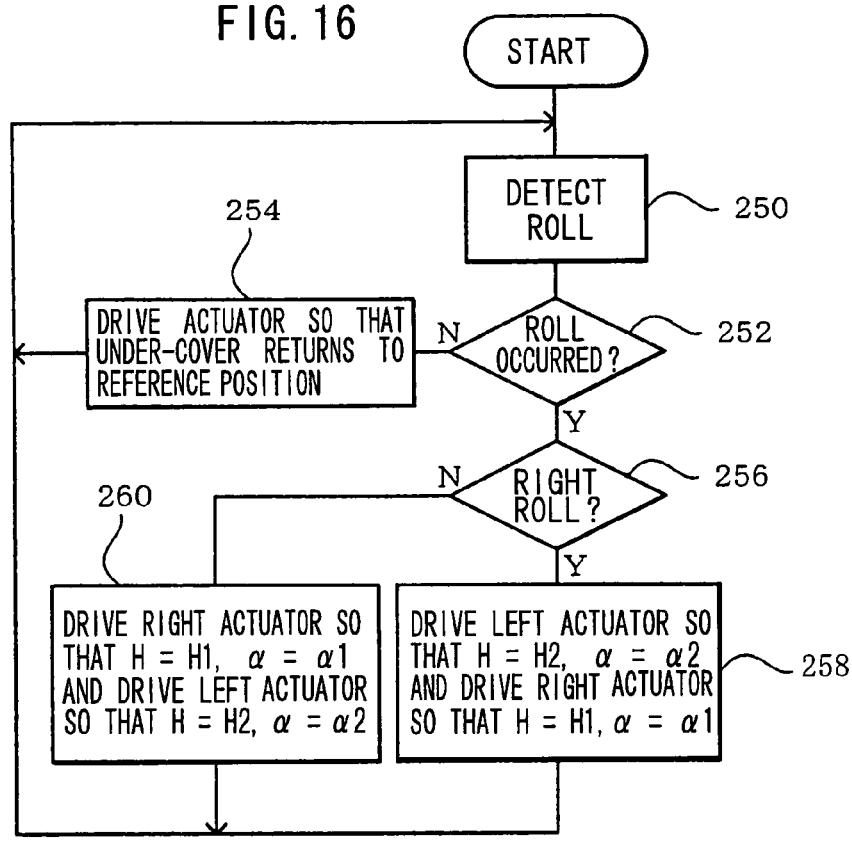
FIG. 16 is a flowchart showing one example of processes carried out by an under-cover control ECU of the vehicle-body underside airflow controller according to the fifth embodiment of the invention.

Next, one example of control made by the under-cover controlling ECU 38 of the vehicle-body underside airflow controller of the fifth embodiment of the invention will be explained. FIG. 16 is a flowchart showing one example of processes carried out by the under-cover control ECU 38 of the vehicle-body underside airflow controller according to the fifth embodiment of the invention.

At first, the under-cover controlling ECU 38 detects rolling in Step 250. That is the under-cover controlling ECU 38 detects the rolling inputted from the rolling detecting sensor 40 and shifts the process to Step 252.

In Step 252, whether or not the rolling has occurred is judged. This judgment is made by judging whether or not the rolling has occurred in the vehicle on the basis of the signal inputted from the rolling detecting sensor 401. When this judgment is No, the process shifts to Step 254.

In Step 254, the under-cover controlling ECU 38 drives each actuator 10 so that the under-cover 10 returns to reference position (reference road clearance and rise angle set in advance). Then, the process returns to Step 250 to repeat the aforementioned processes. It is noted that when the under-cover 10 is located already at the reference position, the process returns to Step 250 as it is by skipping Step 254.

When the judgment in Step 252 is Yes on the other hand, the process shifts to Step 256 to judge whether or not the rolling that is occurring is right rolling. This judgment is made by judging whether the rolling detecting result inputted from the rolling detecting sensor 04 is right rolling or left rolling. When it is right rolling, the judgment is Yes and the process shifts to Step 258. When it is left rolling, the judgment is No and the process shifts to Step 260.

Figure 17:
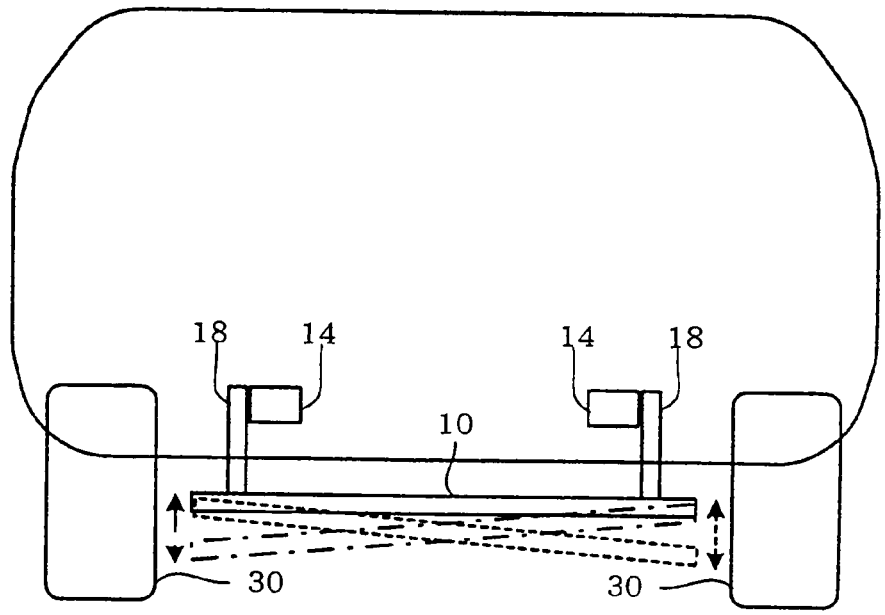
FIG. 17 is a schematic diagram showing a case when a rise angle is differentiated at the right and left under-cover by the vehicle-body underside airflow controller of the fifth embodiment of the invention.

In Step 258, the under-cover controlling ECU 38 drives the left actuators 14FL and 14RL so that the road clearance of the under-cover 10 becomes H2 and the rise angle of the under-cover 10 becomes α2 and drives the right actuators 14FR and 14RR so that the road clearance of the under-cover 10 becomes H1 and the rise angle of the under-cover 10 becomes α1. Then the process returns to Step 250 to repeat the aforementioned processes. That is, as indicated by a dot chain line shown in FIG. 17, the under-cover 10 is moved to positions (road clearance and rise angle) different on the right and left. It is twisted because the under-cover 10 is made from a flexible material. Then, the road clearance of the right side of the under-cover 10 becomes H1 and the rise angle thereof becomes α1 as shown in FIG. 1A and the road clearance of the left side of the under-cover 10 becomes H2 and the rise angle thereof becomes α2 as shown in FIG. 1A. Accordingly, the force attracting the vehicle to the road surface on the left side of the under-cover 10 becomes greater than that of the right side. That is, the force acts in a direction of stabilizing the vehicle, allowing the stability in rolling to the right to be improved.

In Step 260, the under-cover controlling ECU 38 drives the left actuators 14FL and 14RL so that the road clearance of the under-cover 10 becomes H1 and the rise angle of the under-cover 10 becomes α1 and drives the right actuators 14FR and 14RR so that the road clearance of the under-cover 10 becomes H2 and the rise angle of the under-cover 10 becomes α2. Then, the process returns to Step 250 to repeat the aforementioned processes. That is, as indicated by a doted line shown in FIG. 17, the under-cover 10 is moved to positions (road clearance and rise angle) different on the right and left thereof. It is twisted because the under-cover 10 is made from a flexible material. Then, the road clearance of the right side of the under-cover 10 becomes H2 and the rise angle thereof becomes α2 as shown in FIG. 1A and the road clearance of the left side of the under-cover 10 becomes H1 and the rise angle thereof becomes α1 as shown in FIG. 1A. Accordingly, the force attracting the vehicle to the road surface on the right side of the under-cover 10 becomes greater than that of the left side. That is, the force acts in a direction of stabilizing the vehicle, allowing the stability in rolling to the left to be improved.

Thus, according to the fifth embodiment, it is possible to improve the steering stability of the vehicle by arranging so that the aerodynamic performance of the under-cover 10 acts in the direction of stabilizing the vehicle during rolling by detecting and suppressing the rolling by changing the under-cover 10 so that the road clearance and rise angle thereof are different on the right and left thereof.

It is noted that although the road clearance and rise angle of the under-cover 10 have been changed in the fifth embodiment in the same manner with the first embodiment, only the rise angle of the under-cover 10 may be changed similarly to the third embodiment.

Sixth Embodiment

Next, the vehicle-body underside airflow controller of a sixth embodiment of the invention will be explained. It is noted that the state in which the vehicle-body underside airflow controller of the sixth embodiment is attached to the body is the same with the third embodiment, its explanation will be omitted here.

The vehicle-body underside airflow controller of the sixth embodiment is what detects the vehicle speed, pressure under the under-cover 10 and rolling of the vehicle, respectively, and controls the rise angle of the under-cover 10 corresponding to each detected result.

Figure 18:
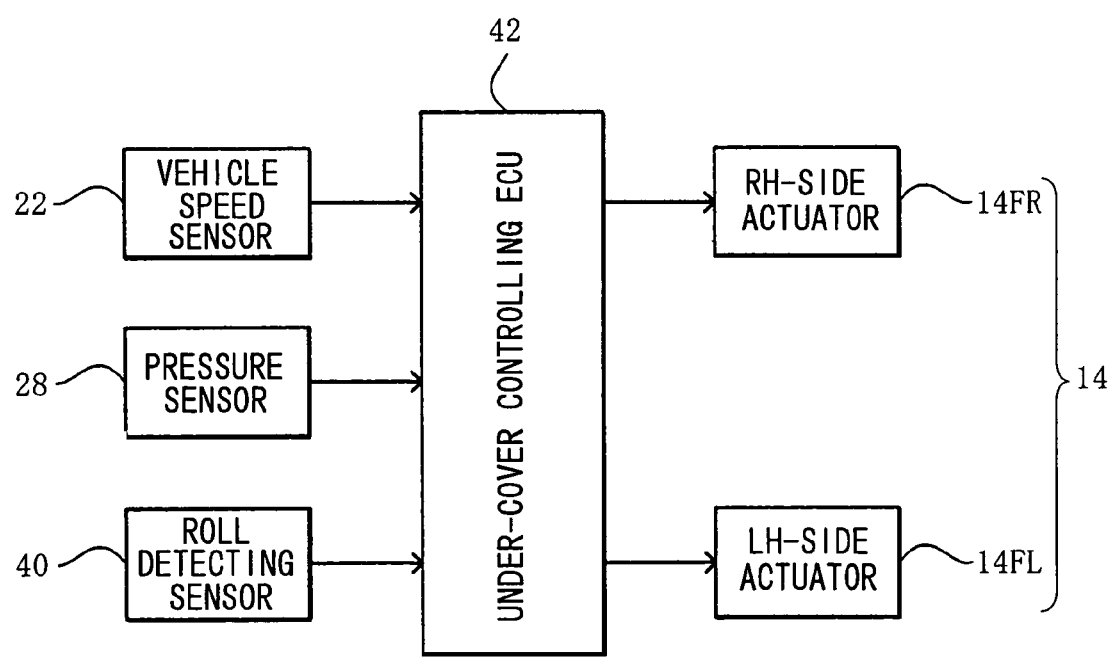
FIG. 18 is a block diagram showing a configuration of a control system of a vehicle-body underside airflow controller according to a sixth embodiment of the invention.

FIG. 18 is a block diagram showing a configuration of a control system of the vehicle-body underside airflow controller of the sixth embodiment of the invention. It is noted that the same components with those of the first through fifth embodiments will be explained by denoting the same reference numerals.

In the vehicle-body underside airflow controller, the actuators 14 described above are connected to an under-cover control ECU 42 for controlling positions of the under-cover 10. It is noted that while there are two changing means 12 in the present embodiment in the same manner with the third embodiment, the actuator on the right side of the vehicle will be denoted as the RH-side actuator 14RH and the actuator on the left side as the LH-side actuator 14LH in FIG. 18. When the actuators are not specifically discriminated in the following explanation, they will be denoted as the actuator 14.

The vehicle speed sensor 22 is connected to the under-cover controlling ECU 42 to input running speed of the vehicle (vehicle speed) and the under-cover controlling ECU 42 controls the rise angle of the under-cover 10 by driving each actuator 14 corresponding to the vehicle speed.

The pressure sensor 28 is also connected to the under-cover controlling ECU 42 to input a result detected by the pressure sensor 28. The under-cover controlling ECU 42 controls the actuator 14 corresponding to the result detected by the pressure sensor 28.

The rolling detecting sensor 40 is also connected to the under-cover controlling ECU 42 to input and detect rolling of the vehicle. The under-cover controlling ECU 42 controls the rise angle of the under-cover 10 by driving each actuator 14 corresponding to the rolling.

Then, the under-cover controlling ECU 42 stores the driving value of the actuator 14 that changes the rise angle of the under-cover 10 to α1 and α2 (see FIG. 7) so as to control and drive each actuator 14 corresponding to the result detected by each sensor and controls and drives the actuator 14 corresponding to the driving value. It is noted that the rise angle α1 of the under-cover 10 is set to be a rise angle used when the vehicle speed is low and the rise angle α2 is set to be a rise angle used when the vehicle speed is high.

The under-cover controlling ECU 42 also stores the threshold value of the vehicle speed set in advance to control each actuator 14 corresponding to the vehicle speed. The under-cover controlling ECU 42 judges whether or not the vehicle speed is high by using the threshold value of the vehicle speed and controls the drive of each actuator 14 on the basis of the judged result.

The under-cover controlling ECU 34 also stores the threshold value for driving the actuator 14. That is, it stores, as the threshold value, the boundary between the steady region on the low speed and low pressure side and the released region on the high speed and high pressure side as shown in FIG. 9 and controls the rise angle of the under-cover 10 by driving the actuator 14 on the basis of the threshold value.

Figure 19:
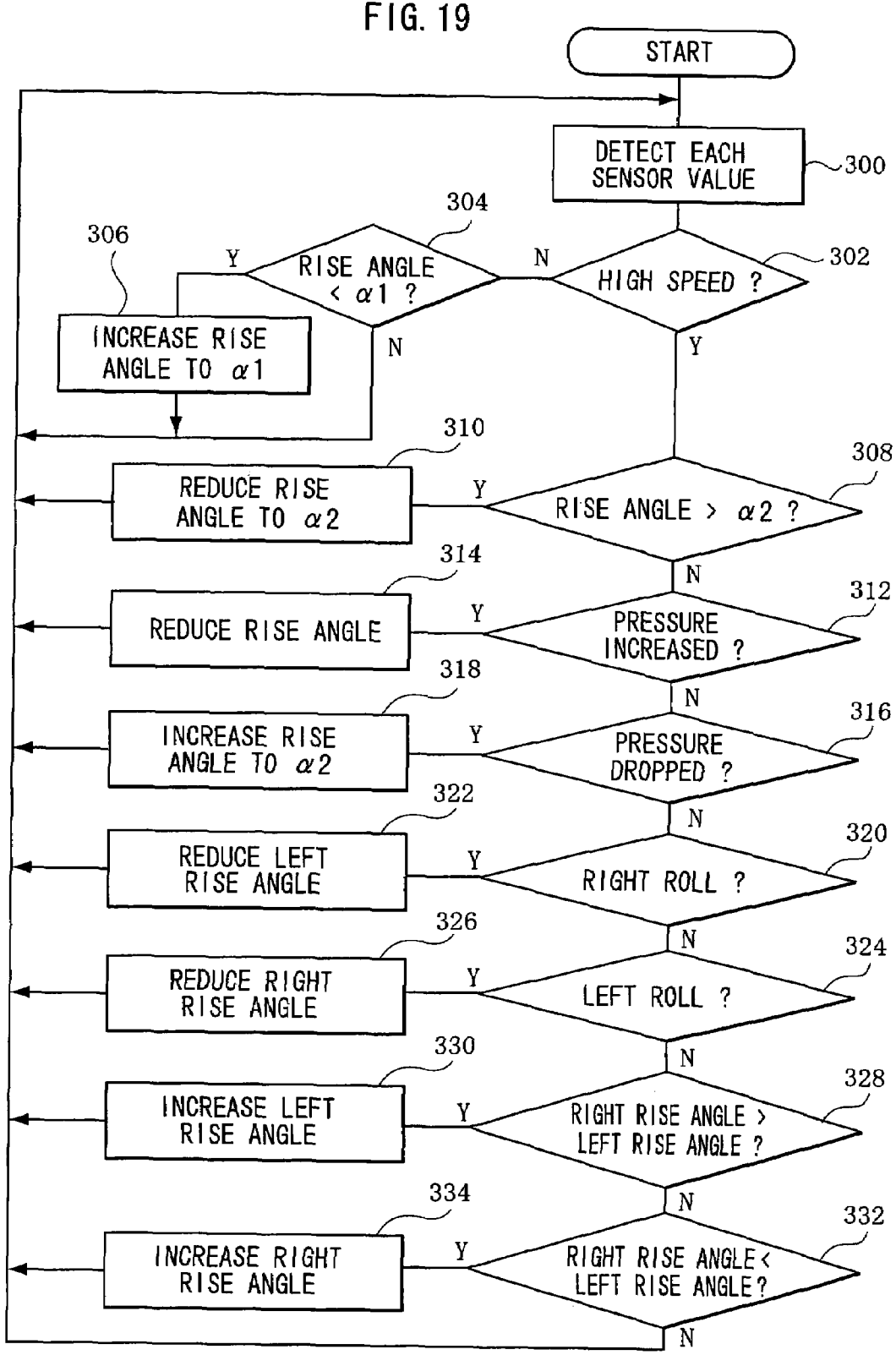
FIG. 19 is a flowchart showing one example of processes carried out by an under-cover control ECU of the vehicle-body underside airflow controller according to the sixth embodiment of the invention.

Next, one example of control made by the under-cover controlling ECU 42 of the vehicle-body underside airflow controller of the sixth embodiment of the invention will be explained. FIG. 19 is a flowchart showing one example of processes carried out by the under-cover control ECU 42 of the vehicle-body underside airflow controller according to the sixth embodiment of the invention.

At first, the under-cover controlling ECU 42 detects each sensor value in Step 300. That is, the under-cover controlling ECU 42 detects the results detected by the respective sensors and inputted from the vehicle speed sensor 22, the pressure sensor 28 and the rolling detecting sensor 40 and shifts the process to Step 302.

In Step 302, whether or not the vehicle speed is high speed is judged. This judgment is made by judging whether or not the detected vehicle speed is greater than the threshold value of the vehicle speed stored in the under-cover controlling ECU 42 and when the judgment is Yes, shifts the process to Step 308 and when the judgment is No, shifts the process to Step 304.

In Step 304, the under-cover controlling ECU 42 judges whether or not the rise angle of the under-cover 10 is smaller than $\alpha 1$. When the judgment is Yes, the process shifts to Step 306 and when it is No, the process shifts to Step 300 to repeat the aforementioned processes.

In Step 306, the actuator 14 is driven to increase the rise angle until the rise angle becomes $\alpha 1$. Then, the process returns to Step 300 to repeats the aforementioned processes. That is, when the vehicle speed is low, the rise angle of the under-cover 10 becomes $\alpha 1$ as shown in FIG. 7 and the aerodynamic performance of the under-cover 10 may be obtained by the rise angle $\alpha 1$ set for the low vehicle speed.

In Step 308, whether or not the rise angle of the under-cover 10 is greater than $\alpha 2$ is judged. This judgment is made by detecting the driving value of the actuator 10 and when the judgment is No, shifts the process to Step 310 to drive the actuator 14 to decrease the rise angle of the under-cover 10 until the rise angle becomes $\alpha 2$. Then, the process returns to Step 300 to repeat the aforementioned processes. That is, the rise angle is reduce to $\alpha 2$ when the rise angle is larger than $\alpha 2$ during when the vehicle speed is high, so that the aerodynamic performance of the under-cover 10 may be obtained by the rise angle $\alpha 2$ for the high vehicle speed set in advance.

When the judgment in Step 308 is Yes, the process proceeds to Step 312 to judge whether or not the pressure under the under-cover 10 has increased. This judgment is made by judging whether or not the pressure detecting result of the pressure sensor 28 and the vehicle speed detecting result of the vehicle speed sensor 22 are located within the released region shown in FIG. 9. When the judgment is Yes, the process shifts to Step 314 and when it is No, the process shifts to Step 316.

In Step 314, the actuator 14 is driven to reduce the rise angle of the under-cover 10 and returns the process to Step 300 to repeat the aforementioned processes. That is, because the airflow is released from the under-cover 10 and does not flow along the under-cover 10 when the detected results of the airflow under the under-cover 10 are in the released region shown in FIG. 9, the under-cover controlling ECU 42 reduces the rise angle of the under-cover 10. Thereby, the airflow flows along the under-cover 10 and the aerodynamic performance of the under-cover 10 may be obtained.

In Step 316, whether or not the pressure under the under-cover 10 has been reduced is judged. This judgment is made by judging whether or not the pressure detecting result by the pressure sensor 28 and the vehicle speed detecting result of the vehicle speed sensor 22 are located within the steady region shown in FIG. 9. When the judgment is Yes, the process shifts to Step 318 and when it is No, the process shifts to Step 320.

In Step 318, the actuator 14 is driven to increase the rise angle of the under-cover 10 so that the rise angle becomes $\alpha 1$ and after that, the process is returned to Step 300 to repeat the aforementioned processes. That is, the airflow is flowing along the under-cover 10 when the detected results of the airflow under the under-cover 10 are located within the steady region shown in FIG. 9, so that the rise angle of the under-cover 10 is increased to $\alpha 1$ set for the low vehicle speed. Thereby, because the vehicle requires the aerodynamic performance of the under-cover 10 so much when the vehicle speed is low, it is possible to prevent the interference between the road surface and the under-cover 10 by increasing the rise angle of the under-cover 10. It is noted that at this time, the increase of the rise angle is controlled so as not to shift to the released state.

In Step 320, whether or not right rolling has occurred is judged. This judgment is made by judging whether or not the right rolling has occurred from a detected result of the rolling detecting sensor 40. When the judgment is Yes, the process shifts to Step 322 and when it is No, the process shifts to Step 324.

In Step 322, the actuator 14 is driven so as to reduce the rise angle of the left side of the under-cover 10 and after that, the process is returned to Step 300 to repeat the aforementioned processes. That is, when the right rolling occurs, the under-cover controlling ECU 42 controls so as to reduce the right rolling by enhancing the aerodynamic performance of the left side of the under-cover 10, so that it can stabilize the attitude of the vehicle.

In Step 324, whether or not left rolling has occurred is judged. This judgment is made by judging whether or not the left rolling has occurred from the detected result of the rolling detecting sensor 40. When the judgment is Yes, the process shifts to Step 326 and when it is No, the process shifts to Step 328.

In Step 322, the actuator 14 is driven so as to reduce the rise angle of the right side of the under-cover 10 and after that, the process is returned to Step 300 to repeat the aforementioned processes. That is, when the left rolling occurs, the under-cover controlling ECU 42 controls so as to reduce the left rolling by enhancing the aerodynamic performance of the right side of the under-cover 10, so that it can stabilize the attitude of the vehicle.

In Step 328, whether or not the rise angle of the right side of the under-cover 10 is greater than the rise angle of the left side is judged. This judgment is made by detecting the driving value of each actuator for example. When the judgment is Yes, the process shifts to Step 330 and when it is No, the process shifts to Step 332.

In Step 330, the actuator 14 is driven so as to increase the rise angle of the left side of the under-cover 10 and after that, the process is returned to Step 300 to repeat the aforementioned processes. Thereby, when no rolling is occurring and when the rise angle of the under-cover 10 differs on the right and left, the under-cover controlling ECU 42 controls so that the rise angle is equalized.

In Step 332, whether or not the rise angle of the right side of the under-cover 10 is smaller than the rise angle of the left side is judged. This judgment is made by detecting the driving value of each actuator for example. When the judgment is Yes, the process shifts to Step 334 and when it is No, the process shifts to Step 300 as it is to repeat the aforementioned processes. Thereby, when no rolling is occurring and when the rise angle of the under-cover 10 differs on the right and left in the same manner with Step 330, the under-cover controlling ECU 42 controls so that the rise angle is equalized.

It becomes possible to obtain the optimum aerodynamic performance of the under-cover 10 by thus controlling the rise angle of the under-cover 10, i.e., by combining the control of the rise angle of the under-cover 10 corresponding to the vehicle speed, the control of the rise angle of the under-cover 10 corresponding to the pressure under the under-cover 10 and the control of the rise angle of the under-cover 10 corresponding to the rolling of the vehicle, in the sixth embodiment.

It is noted that only the rise angle of the under-cover 10 is changed and controlled in the sixth embodiment described above, the arrangement is not limited to that and the road clearance of the under-cover 10 may be changed and controlled as described in the first embodiment. In this case, it is possible to arrange so as to also detect the vehicle height and to control the road clearance of the under-cover 10 corresponding to the vehicle height as described in the second embodiment.

Still more, the combinations of the respective embodiments are not limited to those described above and it is possible to control the rise angle of the under-cover 10 by appropriately combining the respective embodiments.

INDUSTRIAL APPLICABILITY

Furthermore, although the under-cover 10 has been used as the aerodynamic member in each embodiment described above, the aerodynamic member is not limited to that and aerodynamic-dedicated parts such as a diffuser and a baffle plate for example may be applied.

The invention claimed is:

1. A vehicle-body underside airflow controller comprising:
an aerodynamic member attached to the underside of a vehicle-body at the rear of a vehicle such that a rise angle formed between a part inclined upward on the rear side of the vehicle when seen from the side of the vehicle is changeable and that applies force to the vehicle by an airflow flowing at the underside;
changing means for changing the rise angle by moving the vehicle-rear side of the aerodynamic member in the vertical direction of the vehicle;
detecting means for detecting at least one state of the vehicle among vehicle speed, pressure generated by the airflow at the underside of the aerodynamic member and occurrence of rolling of the vehicle; and
control means for controlling the changing means such that the rise angle becomes smaller than the predetermined angle from the initial position of the predetermined angle at a speed higher than a predetermined speed of the vehicle when the aerodynamic performance by means of the aerodynamic member is required on the basis of a result detected by the detecting means.

2. The vehicle-body underside airflow controller according to claim 1, wherein the control means controls the changing means when the vehicle normally runs when the detecting means detects the pressure as the state of the vehicle.

3. The vehicle-body underside airflow controller according to claim 1, wherein the control means controls the changing means so as to change the right and left-side aerodynamic member independently when the detecting means detects an occurrence of rolling of the vehicle.

4. The vehicle-body underside airflow controller according to claim 1, further comprising vehicle height detecting means for detecting vehicle height, wherein the road clearance of the aerodynamic member is changeable, the changing means further changes the road clearance of the aerodynamic member, and the control means controls the changing means so as to change the road clearance of the aerodynamic member on the basis of the detected result of the vehicle height detecting means.

5. The vehicle-body underside airflow controller according to claim 1, wherein the aerodynamic member comprises an under-cover for protecting the underside of the vehicle-body across a width direction of the underside of the vehicle-body.

6. A vehicle-body underside airflow controller comprising:
an aerodynamic member attached to the underside of a vehicle-body at the rear of a vehicle such that a rise angle formed between a part inclined upward on the rear side of the vehicle when seen from the side of the vehicle is changeable and that applies force to the vehicle by an airflow flowing at the underside;
changing means for changing the rise angle by moving the vehicle-rear side of the aerodynamic member in the vertical direction of the vehicle;
detecting means for detecting vehicle speed and released state of the airflow flowing along the aerodynamic member; and
control means for controlling the changing means such that the rise angle becomes smaller than the predetermined angle from the initial position of the predetermined angle at a speed higher than a predetermined speed of the vehicle when the aerodynamic performance by means of the aerodynamic member is required on the basis of a result detected by the detecting means.

* * * * *